United States Patent [19]

Funabashi et al.

[11] Patent Number: 5,097,465
[45] Date of Patent: Mar. 17, 1992

[54] DOUBLE-SIDE PLAYING OPTICAL DISK PLAYER

[75] Inventors: Tadashi Funabashi; Isami Kenmotsu; Yasuhiko Seto; Masao Abe, all of Saitama, Japan

[73] Assignee: Pioneer Electronic Corporation, Tokyo, Japan

[21] Appl. No.: 349,553

[22] Filed: May 9, 1989

[30] Foreign Application Priority Data

| Jun. 20, 1988 | [JP] | Japan | 63-81558[U] |
| Jun. 20, 1988 | [JP] | Japan | 63-81560[U] |
| Jun. 20, 1988 | [JP] | Japan | 63-81563[U] |
| Jun. 20, 1988 | [JP] | Japan | 63-81565[U] |
| Aug. 31, 1988 | [JP] | Japan | 63-216683 |
| Aug. 31, 1988 | [JP] | Japan | 63-216684 |
| Aug. 31, 1988 | [JP] | Japan | 63-216685 |
| Aug. 31, 1988 | [JP] | Japan | 63-216686 |
| Aug. 31, 1988 | [JP] | Japan | 63-216687 |

[51] Int. Cl.$^5$ .................. G11B 1/00; G11B 21/04; G11B 25/04
[52] U.S. Cl. .................. 369/199; 369/75.2; 369/77.1; 369/195; 369/77.2
[58] Field of Search ............... 369/195, 199, 284, 273, 369/244, 16, 17, 43, 44, 18, 44, 28, 75.2, 77.1, 77.2; 360/77.02, 78.04, 78.12, 99.01, 99.02, 99.12, 101–110, 133

[56] References Cited

U.S. PATENT DOCUMENTS

| 4,839,881 | 6/1989 | Takahara et al. | 369/199 X |
| 4,903,140 | 2/1990 | Okamoto et al. | 369/199 X |
| 4,949,328 | 8/1990 | Kase et al. | 369/199 X |
| 4,953,154 | 8/1990 | Takahara et al. | 369/199 X |

Primary Examiner—Paul Ip
Attorney, Agent, or Firm—Sughrue, Mion, Zinn, Macpeak & Seas

[57] ABSTRACT

A double-side playing optical disk player which plays both sides of a disk placed on a turntable by driving and guiding a carriage carrying an optical pickup with a guide driving mechanism along both surfaces of the disk. The guide driving mechanism is composed of first and second guide mechanisms disposed on respective sides of the disk-carrying surface of the turntable, and a transfer mechanism for transferring the carriage between prescribed engaging/disengaging positions on the front and rear sides of the disk.

23 Claims, 17 Drawing Sheets

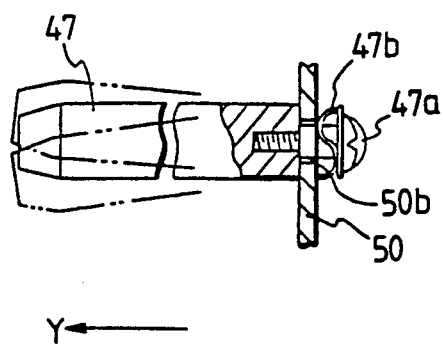
FIG. 8
FIG. 9(a)
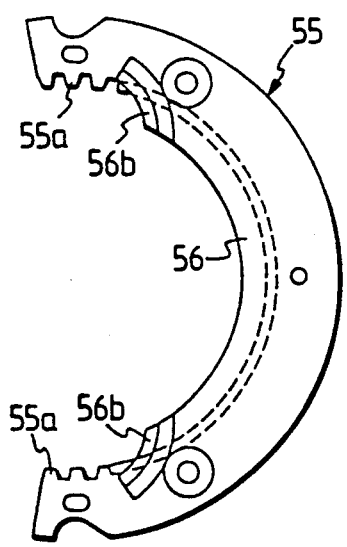
FIG. 9(b)
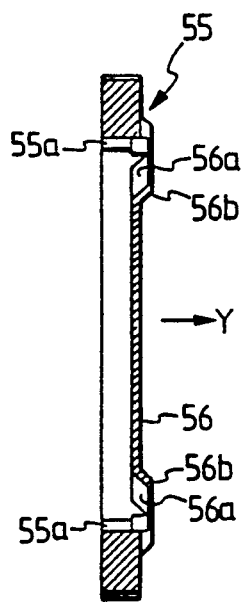
FIG. 10
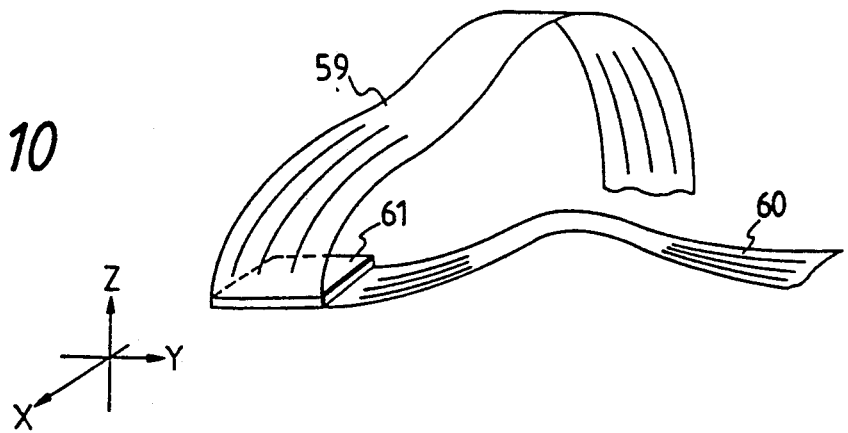

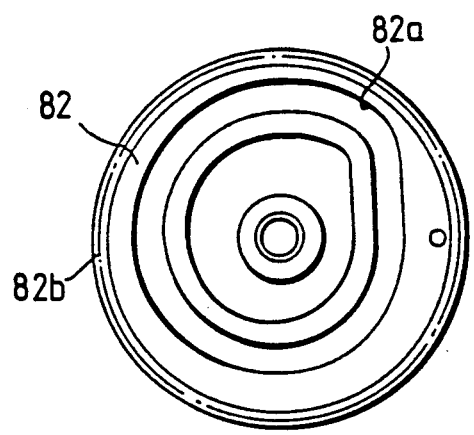
FIG. 15(a)
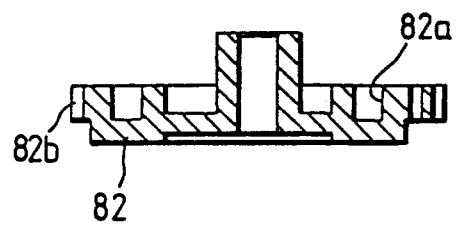
FIG. 15(b)
FIG. 16
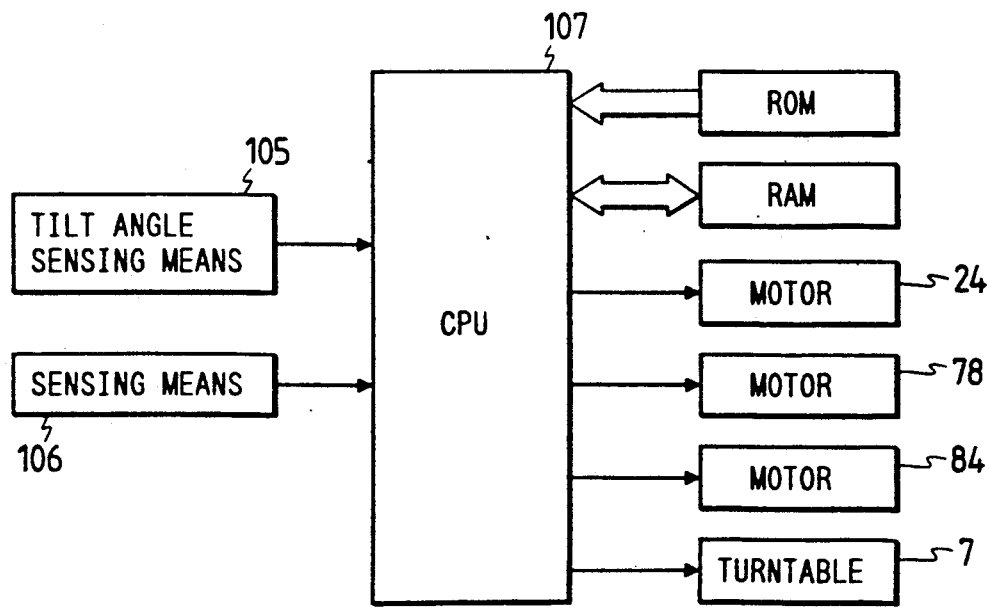

DOUBLE-SIDE PLAYING OPTICAL DISK PLAYER

BACKGROUND OF THE INVENTION

There has heretofore been disclosed a double-side playing optical disk player which is equipped with two optical pickups so as to be able to play both the front and rear recording surfaces of an optical disk (referred to simply as a disk hereinafter) on a turntable without requiring an ejection operation of the disk. Such a double-side playing optical disk player has had a high cost due to the necessity of providing two expensive optical pickups.

In view of this, a double-side playing optical disk player in which a carriage carrying an optical pickup is guided by a drive guiding mechanism over both recording surfaces of a disk placed on the turntable has been proposed, for example, in Japanese Patent Application No. 61-130717. In this double-side playing optical disk player, the drive guiding mechanism employs first and second guide mechanisms disposed on both sides of the disk and which are freely movable in such a way as to permit the carriage to be engaged/disengaged at a prescribed engaging/disengaging position, and a transfer mechanism which transfers the carriage from the engaging/disengaging position of one of the first and second guide mechanisms to the engaging/disengaging position of the other mechanism.

In an optical disk player, a stable reproduced signal cannot be obtained unless the rotational axis of the disk and an extension of the moving locus of the optical axis of the projected reading light beam that accompanies the motion of the optical pickup along the recording surface of the disk intersect each other perpendicularly. In the prior art double-side playing optical disk player, the required orthogonality condition can be secured for one side of the disk, but maintaining orthogonality for the other side has proved difficult, and hence stable reproduced signals have not been obtained from both sides.

In addition, in an optical disk player, if the orthogonality relation between the disk recording surface and the projected light emitted by the optical pickup toward the recording surface is disturbed, distortion is generated in the shape of the pickup spot focused on the recording track being read, which causes leakage of information from adjacent recording tracks, giving rise to the phenomenon of cross-talk. Of the various causes that can disturb the initial orthogonality between the optical axis of the projected light beam and the recording surface of the disk, the most significant is the approximately bowl-shaped deformation generated by the contraction that takes place immediately after the formation of the disk. In order to reduce or eliminate cross-talk, it is necessary to provide a tilt servo mechanism which maintains orthogonality between the optical axis of the projected light beam and the recording surface of the disk.

SUMMARY OF THE INVENTION

The present invention was conceived with the above-mentioned problem in mind, and, therefore, it is an object of the present invention to provide a double-side playing optical disk player that can play both sides of a disk with a single optical pickup yet which provides stable reproduced signals from both sides of the disk, and moreover can carry out rapid adjustment to maintain orthogonality between the axis of disk rotation and the extension of the moving locus of the optical axis of the projected reading light beam that accompanies the motion of the optical pickup along the recording surface of the disk.

The double-side playing optical disk player of the present invention is characterized in that guide driving means, which drives and guides a carriage carrying an optical pickup along both recording surfaces of a disk placed on a turntable, has first and second guide mechanisms carrying the carriage in a freely slidable manner and in such a way as to permit the carriage to be engaged/disengaged at prescribed engaging/disengaging positions on the respective sides of the disk-carrying surface of the turntable, and a transfer mechanism which transfers the carriage from the engaging/disengaging position of one of the first and second guide mechanisms to the engaging/disengaging of the other mechanism, whereby one of the first and second guide mechanisms comprises a pair of fixed guide members that are abutted in a freely slidable manner against both ends of the carriage, while the other mechanism comprises a movable guide member for guiding the carriage provided freely pivotally movable within a plane substantially perpendicular to the rotational axis of the turntable, and fixing means for fixing the movable guide member so as to be able to obtain for both surfaces of the disk the desired orthogonality condition between the rotational axis of the disk and the extension of the moving locus of the reading light beam.

Further, the double-side playing optical disk player in accordance with the present invention is characterized in that the guide driving means, which drives and guides the carriage carrying the optical pickup along both recording surfaces of a disk placed on the turntable, has first and second guide mechanisms carrying the carriage in a freely slidable manner and in such a way as to permit the carriage to be engaged/disengaged at prescribed engaging/disengaging positions on the respective sides of the disk-carrying surface of the turntable, and a transfer mechanism which transfers the carriage from the engaging/disengaging position of one of the first and second guide mechanisms to the engaging/disengaging position of the other mechanism, whereby one of the first and second guide mechanisms comprises a pair of fixed guide members that are abutted in a freely slidable manner against both ends of the carriage, while the other mechanism comprises a fixed support member, a movable guide member for guiding the carriage installed on the fixed support member so as to be freely pivotally movable within a plane substantially perpendicular to the rotational axis of the turntable, and frictional force imparting means which imparts a frictional force between a free end part of the movable guide member and the fixed support member, to thereby obtain for both surfaces of the disk the orthogonality condition between the rotational axis of the disk and the extension of the moving locus of the reading light beam.

Another object of the present invention is to provide a disk player which is capable of playing both sides of the disk by means of a single optical pickup, and more particularly, to a double-side playing optical disk player which enables miniaturization of the player as a whole by making the tilt servo mechanism small in size, and which permits smooth playing, even in cases where the degree of warping of the disk is very large.

The double-side playing optical disk player in accordance with another aspect of the present invention therefore is characterized in that the guide driving means which drives and guides the carriage that carries the optical pickup along both recording surfaces of the disk placed on the turntable comprises first and second guide mechanisms disposed on both sides of the disk-carrying surface of the turntable and which carries the carriage so as to permit engaging/disengaging of the carriage at prescribed engaging/disengaging positions, a transfer mechanism which transfers the carriage at a prescribed engaging/disengaging position, namely, from the engaging/disengaging position of one of the first and second guide mechanisms to the engaging-/disengaging position of the other mechanism, and driving means which moves the carriage on the first and second guide mechanisms and carries out transfer of the carriage by driving the transfer mechanism, and includes in addition a support mechanism which supports the optical pickup on the carriage at a freely adjustable height position in the direction of the rotational axis of the turntable and a freely adjustable tilt angle with respect to the disk-carrying surface of the turntable, and pickup driving means which adjusts the height position and the tilt angle by moving the optical pickup.

The tilt servo mechanism in accordance with the present invention is characterized in that it comprises support means which is provided on a carrying member that is guided in the radial direction of the turntable of the optical disk player and which supports the optical pickup in a freely tiltable manner within a plane including the rotational axis of the turntable, a cam member which is freely rotatably mounted on the carrying member with its rotational axis substantially perpendicular to the tilting surface of the optical pickup, and a driving source which rotates the cam member.

In accordance with a further aspect of the invention, the tilt servo mechanism in accordance with the present invention comprises support means which is provided on a carrying member that is guided in the radial direction of the turntable of the optical disk player and which supports the optical pickup in a freely tiltable manner in a plane including the rotational axis of the turntable, an intermediate member which is freely reciprocatably mounted on the carrying member and which engages with the free end of the optical pickup at the end of its outward stroke, a cam member having an endless cam surface freely rotatably mounted on the carrying member so as to be freely slidably engageable with the end part in the direction of the return stroke of the intermediate member, and a driving source for rotating the cam member.

Further, the double-side playing optical disk player in accordance with the present invention is characterized in that guide driving means which drives and guides the carriage that carries the optical pickup along both recording surfaces of the disk placed on the turntable comprises first and second guide mechanisms arranged on both top and bottom sides of the diskcarrying surface of the turntable and carrying the carriage in such a way as to permit engaging/disengaging of the carriage at prescribed engaging/disengaging positions a transfer mechanism for transferring the carriage from the engaging/disengaging position of one of the first and second guide mechanisms to the engaging/disengaging position of the other mechanism, and driving means for moving the carriage on the first and second guide mechanisms and transferring the carriage by driving the transfer mechanism and which has a support mechanism for supporting the optical pickup on the carriage with its height position being freely adjustable in the direction of the rotational axis of the turntable, pickup driving means for adjusting the height position by moving the optical pickup, and control means for controlling the transfer mechanism and the pickup driving means, whereby the control means controls the pickup driving means so as to separate the optical pickup from the disk-carrying surface which controls the transfer mechanism in such a way as to transfer the carriage between the first and second guide mechanism.

It is another object of the present invention to provide a double-side playing optical disk player which is capable of playing both sides of a disk using a single optical pickup and which can carry out an angle correction adjustment that matches the surface of both sides of the disk.

In accordance with yet further aspects of the present invention, there is provided a double-side playing optical disk player which plays both sides of a disk by driving and guiding a carriage that carries optical pickup means along first and second moving paths that extend along both recording surfaces of the disk placed on the turntable, characterized in that the first and second moving paths, each of which is defined by a set of mutually parallel longitudinal guiding members, has a transfer mechanism which transfers the carriage from one longitudinal guiding member to another set, the carriage has a pair of engaging parts each of which engages with each longitudinal guiding member, at least one of the two engaging elements within a plane intersecting with the first or second moving path is adjustable, and the angular position in the tangential direction of the reading light beam for the disk recording surface is adjustable for both surfaces of the disk.

It is still another object of the present invention to provide a double-side playing optical disk player which is capable of playing both sides of a disk using a single optical pickup and which is capable of obtaining stable reproduced signals from both surface of the disk.

The double-side playing optical disk player in accordance with the present invention is further characterized in that guide driving means which drives and guides a carriage that carries the optical pickup along both recording surfaces of a disk placed on the turntable includes first and second guide mechanisms disposed on respective sides of the disk-carrying surface of the turntable to carry the carriage so as to permit its engaging-/disengaging at a prescribed engaging/disengaging position and a transfer mechanism which transfers the carriage from the engaging/disengaging position for one of the first and second guide mechanisms to the engaging/disengaging position of the other mechanism, whereby, with the position of the guiding path of at least one of the first and second guide mechanisms being freely adjustable within a plane perpendicular to the rotational axis of the turntable, orthogonality between the rotational axis of the disk and the extension of the moving locus of reading light beam is obtained for both surfaces of the disk.

It is still another object of the present invention to provide a double-side playing optical disk player in which guide driving means which drives and guides a carriage that carries an optical pickup along both recording surfaces of a disk placed on the turntable comprises first and second guide mechanisms disposed on respective sides of the disk-carrying surface of the turntable in such a way as to permit engaging/disengaging of the carriage at prescribed engaging/disengaging positions, a gripping member which grips the carriage when located at a prescribed engaging/disengaging position, a transfer mechanism which transfers the gripping member from the engaging/disengaging position of one of the first and second guide mechanisms to the engaging/disengaging position of the other mechanism along a surface intersecting the guiding direction of both guide mechanisms, and driving means which moves the carriage on the first and second guide mechanisms and transfers the gripping member by driving the transfer mechanism, the driving means including a pair of rack members extending in the guiding direction of the pair of guide mechanisms, a gear carried freely rotatably by the carriage and which meshes with each of the rack members, and a driving source which imparts a torque to the gear provided on the carriage, whereby the rotational axis of the gear is positioned within a surface intersecting the direction of extension of each of the rack members by forming the teeth of the pair of rack members so as to be in the transfer range of the gripping member, whereby the rotational direction of the gear is made constant during the transition of the pickup between the forward rotation position and the reverse rotation position.

Further, the double-side playing optical disk player in accordance with the present invention is characterized in that guide driving means which drives and guides a carriage that carries an optical pickup along both recording surfaces of a disk placed on the turntable comprises first and second guide mechanisms disposed on the respective sides of the disk-carrying surface of the turntable for carrying the carriage engagement/disengagement at prescribed engaging/disengaging positions, a gripping member for gripping the carriage located at a prescribed engaging/disengaging position, a transfer mechanism which transfers the gripping member from the engaging/disengaging position of one of the first and second guide mechanisms to the engaging/disengaging position of the other mechanism along a surface intersecting the guiding direction of both of the guide mechanisms, and driving means which moves the carriage on the first and second mechanisms and transfers the gripping member by driving the transfer mechanism, the transfer mechanism having a rotating member freely rotatably within the above-mentioned surface for carrying the gripping member, and including wiring means which carries electric power supply and electrical signals for the optical pickup means, a first flexible part disposed within a plane perpendicular to the rotational axis of the rotating member, and a second flexible part which is provided within a plane parallel to the rotational axis and is connected to the optical pickup means, whereby the second flexible part is formed using a flexible substrate which engages with the rotating member to prevent the flexible substrate from generating distortion during the motion of the carriage along both recording surfaces of the disk and during an inverting operation of the carriage to accommodate both of the recording surfaces.

BRIEF DESCRIPTION OF THE DRAWINGS

FIG. 8 is a sectional diagram of the player of FIG. 1 showing the fitting condition of a holding member; gear;

FIGS. 9(a) and 9(b) are diagrams showing the constitution of a solar

FIG. 10 is a diagram showing the constitution of a wiring device in the player of FIG. 1

FIGS. 15(a) and 15(b) are a diagram showing the constitution of a cam member;

FIG. 16 is a block diagram showing the constitution of a control system;

DESCRIPTION OF THE PREFERRED EMBODIMENTS

Referring to the accompanying drawings, a first preferred embodiment of a double-side playing optical disk player constructed in accordance with the present invention will now be described.

As shown in FIGS. 1 through 4, in the player housing (not shown) of the double-side playing optical disk player there are provided a lower chassis 5 and an upper chassis 6 that are linked, for example, by three leg members 1, 2 and 3. In the Figure, the direction of the arrow Y is the front and the direction of the arrow X is the left side of the player. In addition, the arrow Z points to the upward direction.

Figure 1:
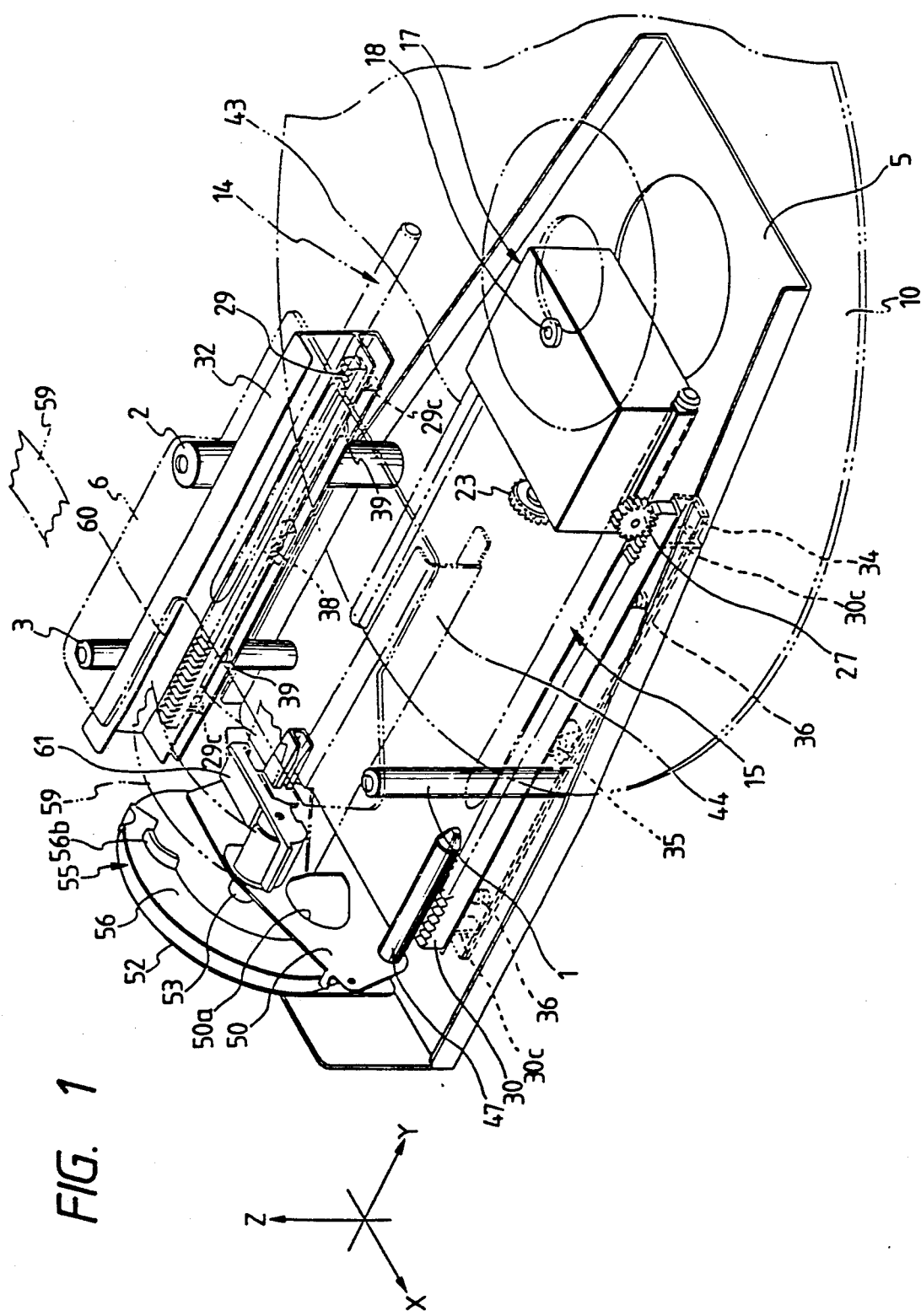
FIG. 1 is a perspective view showing the internal structure of a double-side playing optical disk player of a preferred embodiment of the present invention.
Figure 2:
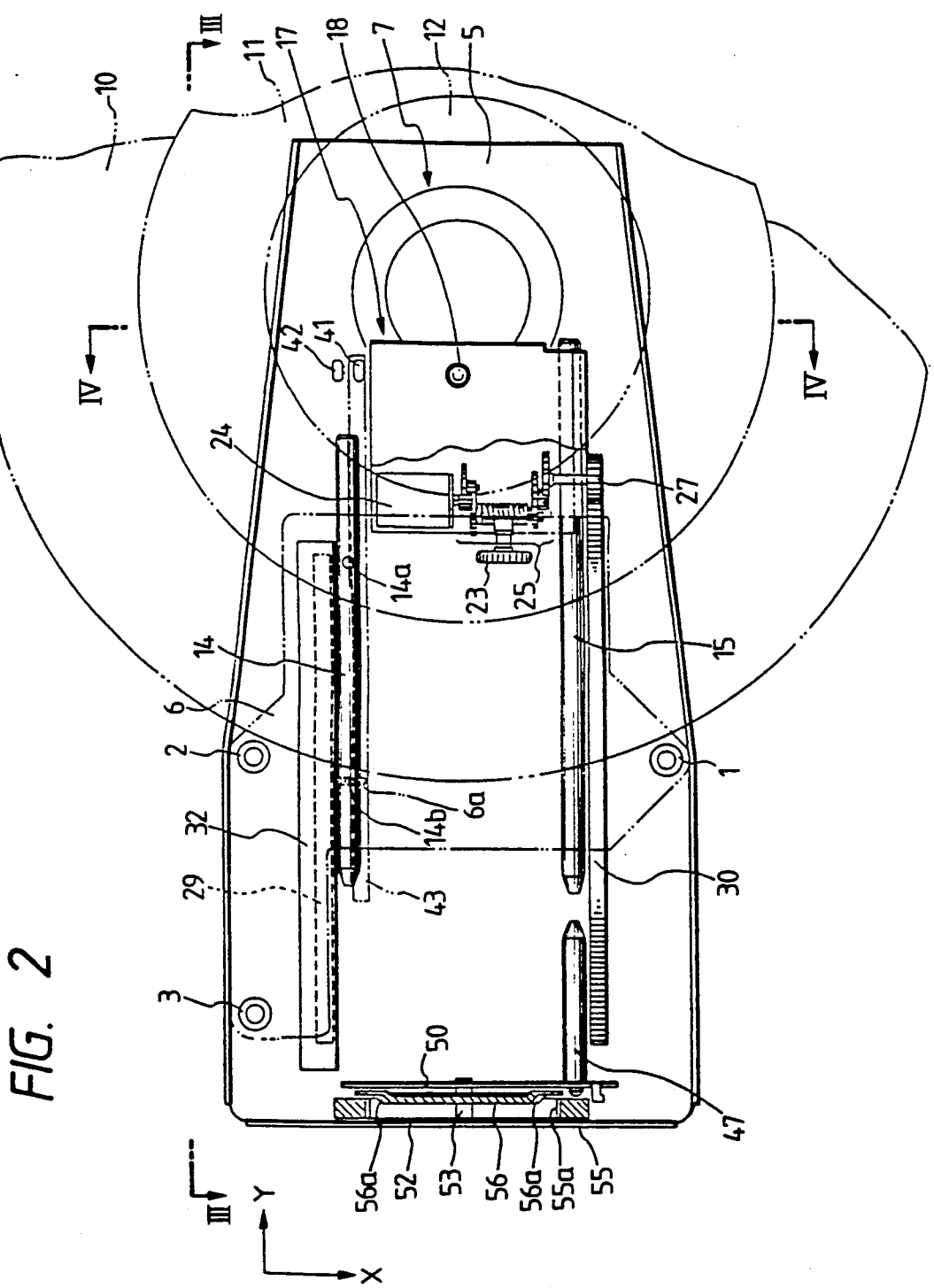
FIG. 2 is a plan view of the player of FIG. 1.
Figure 3:
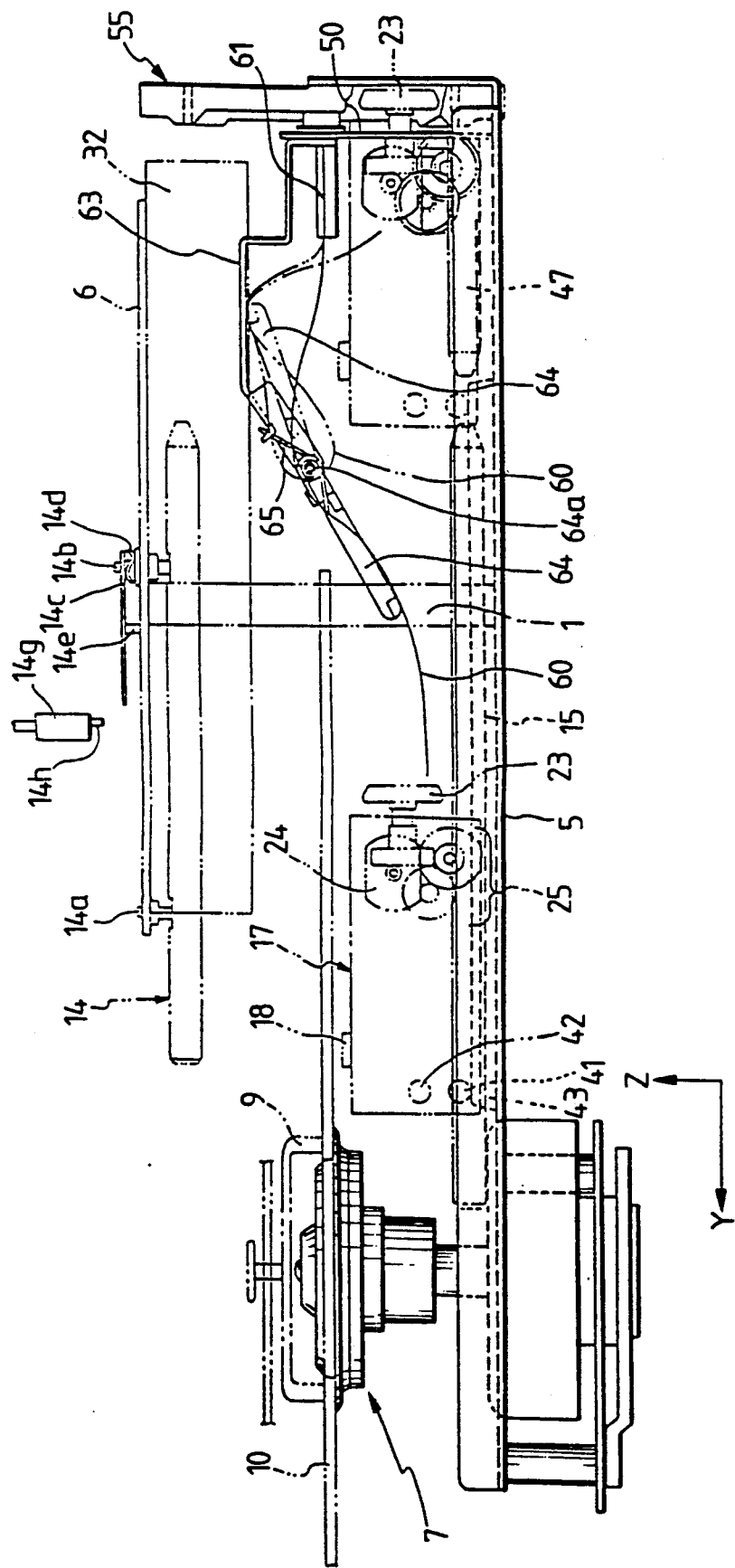
FIG. 3 is a right-side elevational view of the player of FIG. 1.

As shown in FIGS. 2 and 3, at the front end of the lower chassis 5 there is installed a turntable 7, and a disk 10 is clamped onto the turntable by means of a clamper 9. The disk 10 shown in FIGS. 1, 3 and 4 has a diameter of about 30 cm, and is formed by bonding two discoidal substrates each having a signal recording layer located inside of the disk. It is to be noted in this disk player that it is possible to carry out playing also of disks with diameters of about 20 cm and 12 cm. The turntable has a centering member for aligning each disk by engagement with the center opening of the disk of each diameter.

In the radial direction of the disk 10, which is the front to rear direction (the direction of the arrow Y and that opposite to it), a cylindrical movable first guiding member 14 and a fixed second guiding member 5 are disposed so as to be parallel to the recording surfaces of the disk and to sandwich the disk from above and from below. each being attached to the upper chassis 6 and the lower chassis 5. A carriage 17 is provided to be freely engageable/disengageable with the first and second guiding members 14 and 15, respectively. The carriage 17 carries an optical pickup having an optical system that includes an objective lens 18 and a servo driving mechanism for servo-driving the objective lens 18 in two directions, namely, the direction of the optical axis of the objective lens (focusing direction) and the direction perpendicular thereto (tracking direction). The details of the carriage 17 will be discussed later.

The optical pickup reads recorded information based on changes in reflected light from a reading light beam which is projected onto the recording surface of the disk.

In the rear end of the carriage 17 there is installed a satellite gear 23 which is driven by a motor 24 mounted on the carriage via a gear transmission mechanism 25. (It is to be noted that the motor 24 and the gear transmission mechanism 25 are not shown in FIG. 1.) On the left end of the carriage 17 there is provided another gear 27 which is also driven by the movable first guide member 14 and the second guide member 15 and can be meshed with both rack members 29 and 30.

Figure 5:
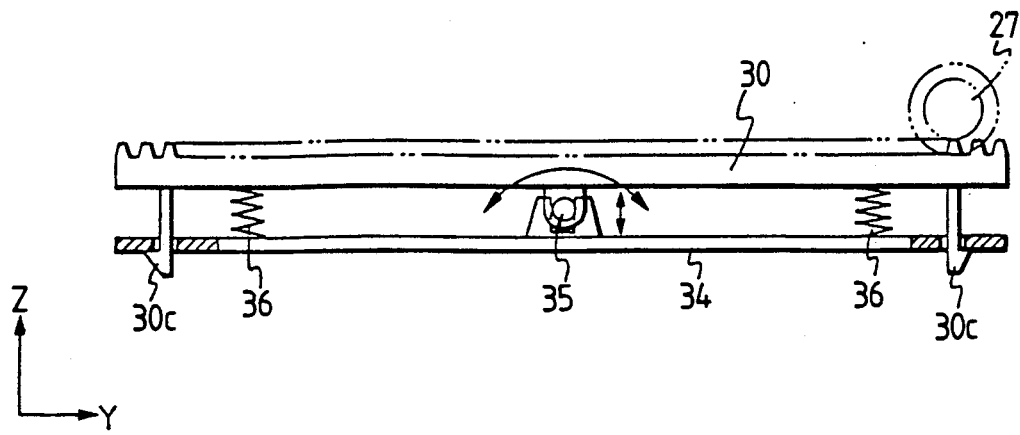
FIG. 5 is an elevational view of the player of FIG. 1 showing the fitting condition of the rack.

As shown in FIGS. 1, 2, and 5, the rack member 30 on the left is rockably mounted substantially at the central part of a bracket 34 which is fixed to the lower chassis 5 via a pin 35, and its free end can approach to and recede from the gear 27 in the direction perpendicular to the direction of motion of the optical pickup. In addition, pawl members 30c are formed on the bottom face in the vicinity of both ends of the rack member 30, which pawl members are engaged with a bracket 34 so that the rocking of the rack member is regulated to within a prescribed range. As is clear particularly from FIG. 5, there are provided a pair of coil springs 36 in the front to impart a bias force in order to energize the free end parts of the rack member 30 in the direction of approaching the gear 27.

Figure 4:
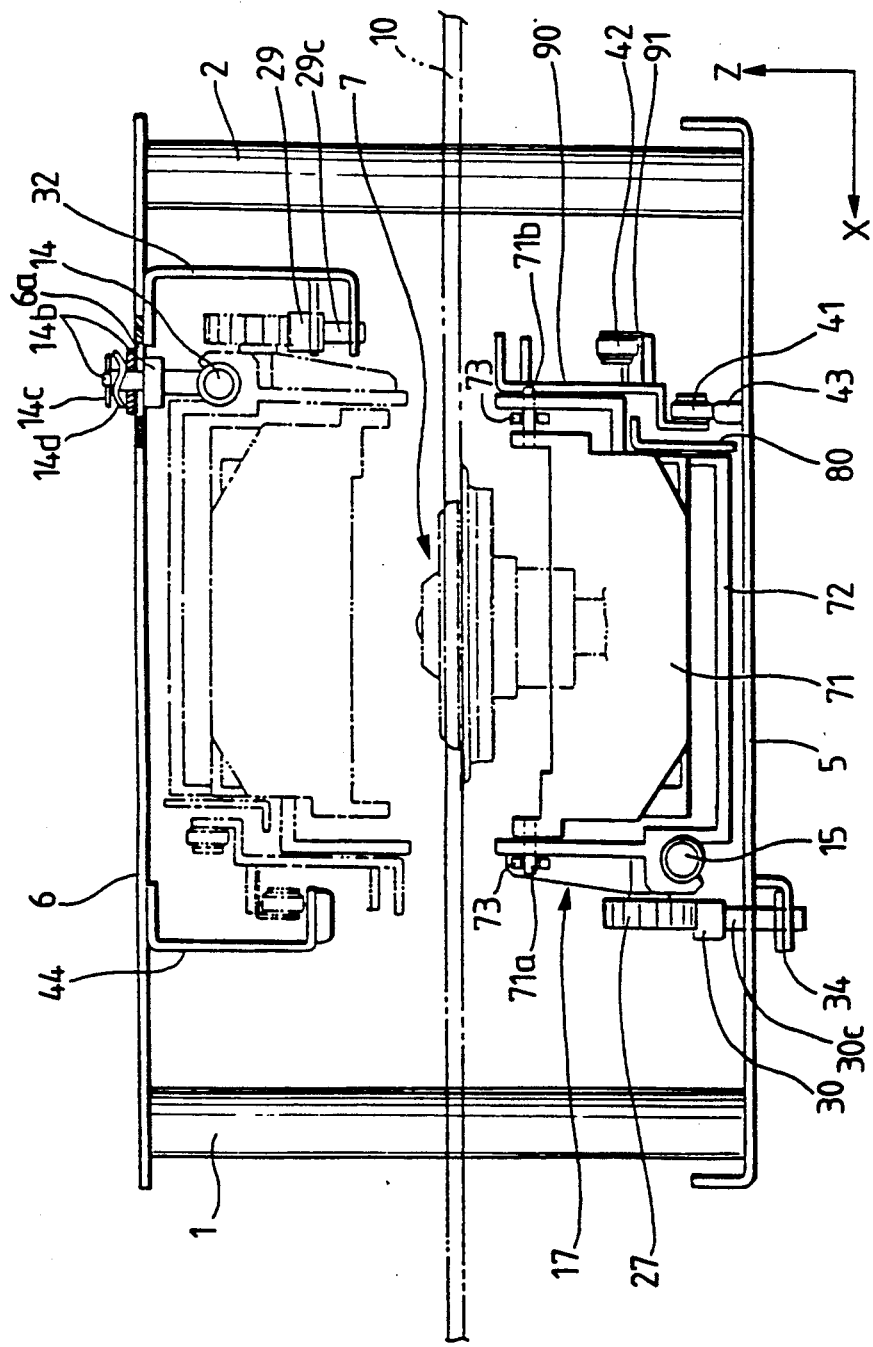
FIG. 4 is a front view of the same.

As shown in FIGS. 1 and 4, the rack member 29 on the right side is mounted freely rockably in a plane perpendicular to the moving direction pickup on a bracket 32 via a pin 38, analogous to the rack member 30. Further, the rack member 29 has pawl members 29c that engage with the bracket 32 and regulate its range of rocking, and its free end is energized by coil springs 39 that serve to impart a bias force to approach the gear 27.

As shown in FIGS. 2 to 4, the carriage 17 has on its right end two rollers 41 and 42 serving as engaging members and which are separated in the vertical direction (direction of the arrow Z and the direction opposite to it). The lower roller 42 can be rolled along a line defined by a guiding projection 43 provided on the lower chassis 5 in parallel with the second guide member 15, while the upper roller 42 can be rolled along a guide rail serving as a movable guide member mounted on the upper chassis 6 in parallel with the first guide member 14. In other words, for the roller 41, the linear guiding projection 43 provided on the lower chassis 5 serves as a fixed guide member. A first moving path which guides the carriage 17 is freely engageable/disengageable with respect to each of the guide members 14 and 15 at the peaked end parts. These elements constitute together with the holding member 47 a gripping member which grips the carriage 17.

As shown in FIGS. 2, 4, 6 and 7, the first guide member 14, which is a movable guide member, is mounted on the upper chassis 6 serving as a fixed support member via two support shafts 14a and 14b. The support shaft 14a which supports the front end of the first guide member 14 is fixed to or freely rotatably mounted on the upper chassis 6, and the first guide member 14 is free to pivotally move with the support shaft 14a as the center. The support shaft 14a extends in parallel with the rotational axis of the turntable 7 so that the first guide member 14 moves pivotally within a plane perpendicular to the center of rotation. The support shaft 14b for mounting the rear end of the first guide member to the upper chassis 6 is fitted in an oblong aperture 6a formed on the upper chassis 6 extending in the left-right direction (the direction of the arrow X and the direction opposite to it), and preferably has a curvature with the other support shaft 14a as the center of curvature. As is clear particularly from FIGS. 6 and 7, a longitudinal adjustment member 14c is joined by brazing, for example, to the upper end of the support shaft 14b, and between the longitudinal adjustment member and the upper chassis 6 there is installed a spring washer 14d which presses the free end, that is, the rear end, of the first guide member 14 toward the upper chassis 6. The spring washer 14d acts to impart a frictional force between the free end of the first guide member 14 and the upper chassis 6 and the first guide member 14 is fixed to the upper chassis 6 by the frictional force thus created.

It is to be noted that for imparting a frictional force between the free end of the first guide member and the upper chassis 6, various other constructions can also be employed besides the spring washer 14d described above. However, use of the spring washer 14d not only makes it possible to reduce the number of parts needed through creation of a frictional force, but also is effective to reduce costs and is easy to realize through the use of a commercially available product. Moreover, the use of the spring washer 14d permits a constant frictional force to be obtained with no dispersion, which contributes to stabilization of the quality of the device.

Figure 6:
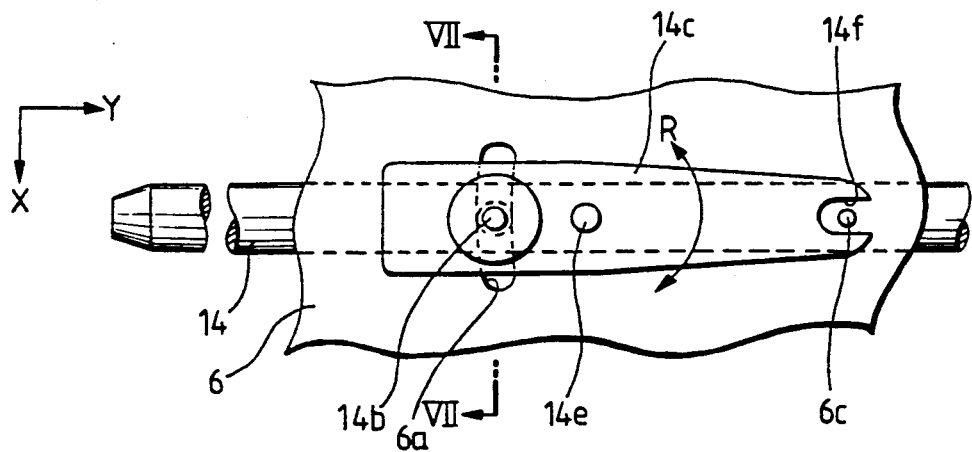
FIG. 6 is a plan view of the same showing the fitting condition of a first guiding member.
Figure 7:
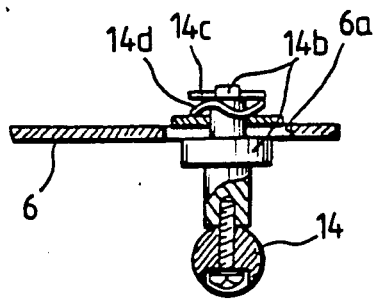
FIG. 7 is a sectional diagram of the same.
Figure 13:
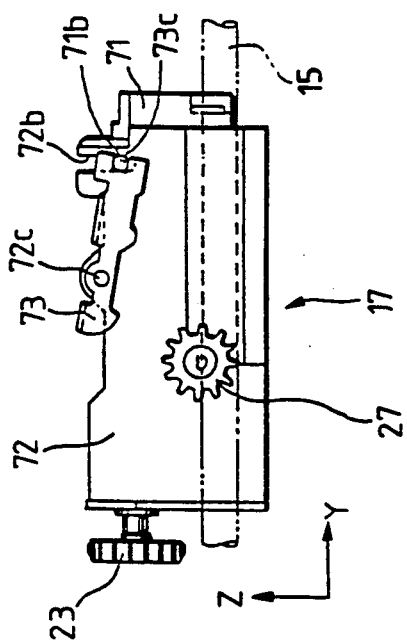
FIG. 13 is a rear view of the carriage of FIG. 11.

As shown in FIGS. 3 and 6, the longitudinal adjustment member 14c, which sandwiches the spring washer 14 together with the upper chassis 6, is provided extending substantially parallel to the first guide member 14, and is mounted via a pin 14e on the upper chassis 6 at its central part and is freely rockable within a plane parallel to the plane of pivotal movement of the first guide member 14. The longitudinal adjustment member 14c is linked at its rear end part to the first guide member 14 via the support shaft 14b. As shown in FIG. 6, a U-shaped notch 14f is formed in the front end part of the longitudinal adjustment member 14c, and a small circular recess 6c is formed in the upper chassis corresponding to the notch. An eccentric driver 14g, shown in FIG. 3, can be inserted in the notch 14f, and an action piece 14h provided on the tip of the eccentric driver can be fitted into the circular recess 6c. Namely, by rotating the eccentric driver 14g, the longitudinal adjustment member 14c can be rocked with the pin 14e as its center, and as a result of this action, the first guide member 14 makes a pivotal motion with the support shaft 14a, with its pivotal point of support as the center, against the frictional force created by the spring washer 14d. That is, it becomes possible to adjust the position of the guiding path of the first guide mechanism that includes the first guide member 14 within a plane perpendicular to the rotational axis of the turntable (shown in FIGS. 3 and 4). With such an arrangement, the rotational axis of the disk and the extension of the moving locus of the optical axis of the projected reading light beam that accompanies the motion of the optical pickup along the recording surface of the disk can be made to intersect with each other for both surfaces of the disk. Namely, the rotational axis of the turntable 7 is made variable during the assembly of the disk player, and the relative positions of the turntable 7 and the second guide member are set so as to guide the carriage 17 along the side B (bottom surface, for example) of the disk by moving the turntable 7. After positioning the rotational axis of the turntable 7 on the extension of the moving locus of the optical axis of the light beam that is projected on the side B, positional adjustment of the guiding path of the first guide mechanism is carried out as mentioned above by rocking the longitudinal adjustment member 14c by means of the eccentric driver in such a manner as to cause the rotational axis of the turntable to intersect with the extension of the moving locus of the optical axis of the reading light beam projected on the side A of the disk. Since substantial orthogonality can be realized between the rotational axis of the disk and the extension of the moving locus of the optical axis of the projected light beam for both surfaces of the disk, reproduced signals which are always stable can be obtained.

In the present embodiment, the pivotal point of support of the first guide member 14 is arranged to be at a position that corresponds to the inner circumference of the disk, or the vicinity thereof, placed on the turntable 7. However, the pivotal point of support may be disposed at a position on the outer circumference of the disk or the vicinity thereof. It should be noted, however, that by providing the pivotal point of support at a position corresponding to the inner circumference, it becomes possible to set the angle of pivotal motion of the first guide member 14 with respect to the rotational axis of the turntable in a highly accurate member. Furthermore, the longitudinal adjustment member 14c provided for pivotally moving the first guide member 14 is not absolutely necessary. That is, instead of using the longitudinal adjustment member 14c, the first guide member 14 may be pivotally moved by directly abutting a predetermined tool against the free end part of the first guide member 14. However, the provision of such a lever-like longitudinal adjustment member 14c can reduce the force required for adjusting the position of the first guide member 14, which leads to highly accurate pivotal motion of the first guide member 14. In addition, as shown in FIG. 6, the longitudinal adjustment member 14c is provided extending in parallel with the first guide member 14. With such a construction, the angle of pivotal motion of the first guide member 14 corresponding to the angle of rocking motion of the longitudinal adjustment member 14c can be made relatively large so that it becomes possible to execute quick adjustment of the position of the first guide member 14.

As shown in FIGS. 1, 3 and 8, a holding member 47, which is fitted to the carriage 17, detached from the first and second guide mechanisms, and holds the carriage 17, is attached to a plate-like rotating member 50 by being extended in the forward direction (direction of the arrow Y). The rotating member 50 is supported freely rotatably by a supporting shaft 53 that extends in the forward direction (direction of the arrow Y) from a mounting plate 52 fixed to the rear end part of the lower chassis 5. Further on the mounting plate 52 there is mounted a half-moon shaped inner-threaded sun gear 55 coaxial with the rotational shaft of the rotating member 50. Details of the sun gear 55 are shown in FIGS. 9(a) and 9(b). The rotating member 50 is arranged so as to be rotatable along a surface, an orthogonal surface in this example, which intersects the guiding direction of the carriage by the first guide mechanism and the second guide mechanism. The planetary gear 23 provided on the carriage 17 can be meshed with the teeth 55a of the sun gear 55. Here, the planetary gear 23 meshes with the sun gear 55 through an insertion hole 50a (shown in FIG. 1) formed in the rotating member 50. On the outer circumference of the sun gear 55 there is integrally provided a flange-like detachment regulating member 56 which regulates the detachment of the planetary gear from its meshing with the sun gear 55 by sliding over the front side face of the planetary gear 23.

The detachment regulating member 56 is provided within a predetermined angular range around the rotational shaft of the sun gear 55. As is particularly clear from FIGS. 9(a) and 9(b), at both end parts of the detachment regulating member there are formed tapered faces 56a tilted in the direction approaching the teeth 55a of the sun gear 55 from one end toward the other end of the detachment regulating member. As a result, the portion where the tapered face is formed represents a projection 56b that protrudes into the front side (direction of the arrow Y) with respect to the other portion of the detachment regulating member. The planetary gear 23 meshes with the teeth 55a of the sun gear 55 while the latter is rotating, and hence starts its rotation immediately. In the initial period of its rotation, the planetary gear is guided by the tapered faces 56a to be drawn to the rear (direction opposite to that of the arrow Y), and is meshed deeply and securely with the teeth 55a of the sun gear.

The rotating member 50 and the detachment regulating member 56 formed integrally with the sun gear 55 form a transfer mechanism which transfers the carriage 17 from the engaging/disengaging position of one of the first and second guide mechanisms to the engaging-/disengaging position of the other mechanism by inverting the carriage 17. Further, a pair of rack members 29 and 30, the sun gear 55, the planetary gear 23, the gear 27, the gear transmission mechanism 25 and the motor 24 installed on the carriage 17 form a driving unit which moves the carriage 17 on the first and second guide mechanisms and carries out inversion of the carriage by driving the transfer mechanism.

Moreover, as is clear from the above description, the holding member 47 is transferred by the rotation of the rotating member 50 along a surface which intersects the guiding direction of the first and second guide members. On the other hand, when the direction of motion of the holding member 47, by which the carriage 17 that carries the optical pickup is gripped and transferred by inversion to cover both recording surfaces of the disk, is made to coincide with the direction of guiding of the first and second mechanisms which guide the carriage during the play of the disk, the stroke of the carriage needed for its inversion must be added to the stroke of the carriage 17 required for the playing of the disk, which, were it not for the invention, would make the disk player large as a whole. However, as described above, by making the moving direction of the carriage during the inversion movement to intersect the moving direction of the carriage during disk playing it becomes possible to accomplish miniaturization of the disk player as a whole.

The reason for making the pair of rack members 29 and 30 rockable within a plane perpendicular to the moving direction of the optical pickup, as described earlier, will now be discussed.

As above, by the rotation of the gear 27, the carriage 17 runs on each of the pair of rack members 29 and 30, and a system is formed in which the carriage 17 is inverted between the rack members by means of the transfer mechanism. With such a constitution, when the gear 27 rolls over the rack member, a reaction force accompanying the rolling movement is exerted from the rack member on the gear 27. Further, another reaction force, that accompanies the inversion of the carriage 17 by the transfer mechanism that includes the rotating mechanism 50, is applied to the carriage 17 from the sun gear via the planetary gear 23. When the gear 27 is about to complete its rolling movement on the rack member, the planetary gear 23 engages with the sun gear 55 so that the two reaction forces mentioned above oppose each other. There may arise a case in which the carriage 17 is unable to move between the rack member and the sun gear 55. However, by constructing the system in such a way that the rack members 29 and 30 are able to be rocked when a force which is greater than a prescribed force greater than the energizing force of the coil springs 36 and 39 is applied, the opposing condition between the two reaction forces can be avoided and the carriage 17 can transit smoothly between the rack member and the transfer mechanism.

As shown in FIG. 8, the holding member 47, which is fitted to the carriage 17 and causes the carriage 17 to be engaged/disengaged alternately with the first and second guide members is mounted on the rotating member 50 with a screw 47a and spring washer 47b. The screw 47a is fitted in a circular aperture 50b formed in the rotating member 50, by which the holding member 47 is made freely rockable with its base end part as the center. Further, the spring washer 47b, which has a corrugated cross section, imparts a bias force toward the home position shown by a solid line in FIG. 8. By making the holding member 47 freely rockable, even if the holding member or the first and second guide members are mounted on the mounting member in a position slightly deviated from the normal position, the holding member 47 is appropriately rocked during the movement of the carriage between these members, and the carriage 17 moves, guided smoothly along the holding member by the first and second guide members. In the present embodiment, the holding member 47 is arranged to be rocked as a whole. However, only the tip part can be rocked, or the tip part or the whole of the holding member 47 may be formed using a material with flexibility. That is, the holding member 47 need only be flexible and restorable for absorbing errors in mounting only in the portion that guides the carriage 17.

As is clear from FIGS. 1 and 4, the gear 27 formed on the carriage 17 and engageable with each of the pair of rack members 29 and 30 has its rotational axis within a plane that intersects the extension direction of each of the rack members with the teeth of the pair of rack members within the range of transfer, namely, the range of inversion, of the holding member 47. Because of such a constitution, the direction of rotation of the gear 27 may be made to remain in the same direction during transition of the carriage 17 between the forward rotational position on opposite sides of the disk, the rotational direction of the gear 27 remains constant, and hence the control circuit for controlling the transition can be simplified.

As shown in FIGS. 1. 3 and 10, there is provided a wiring device for application of power for the optical pickup on the carriage 17 and for transmission of electrical signals. As shown in these Figures, the wiring device is composed of a first flexible part 19 disposed flexibly within a plane perpendicular to the rotational shaft of the rotating member 50 having a connecting part 61 that carries out electrical connection between the first and second flexible parts.

By constructing the wiring device for the optical pickup in this manner, even when the carriage that carries the optical pickup is moved along both recording surfaces of the disk 10 and is inverted so as to face the two recording surfaces, no twisting will occur in the flexible substrate. Hence, the reliability of the device is high.

Corresponding to the movement of the carriage 17 along the recording surfaces of the disk, there is provided a winding/feeding mechanism which winds up and feeds the second flexible part 60.

As shown in FIG. 3, the winding/feeding mechanism includes a first arm member 63 attached to the rotating member 50 in cantilever form, holding on its tip the second flexible part 60 freely slidably thereon a second arm member 6 attached with a pin 64a freely rockable to a position between the winding position and the feeding position, holding at its free end part the second flexible part freely slidably thereon, and a spring member 65 for energizing the second arm member toward the winding position. It is to be noted that the position of the second arm member indicated by the solid line in FIG. 3 is the feeding position, while the position indicated by the two-dot chain line is the winding position.

Next, the construction of the carriage 17 will be described in detail.

As shown in FIGS. 4 and 11 through 14, the carriage 17 has a first case 70 which incorporates an optical system including the objective lens 18 and a servo drive mechanism which servo drives the objective lens in the directions of the optical axis (focusing direction). a second case 71 which holds the first case, and a carrying member 72 which carries the second case 71. The carrying member 72 engages freely slidably on its left end part with the first guide member 14 and the second guide member 15. There are provided pins 71 and 71b projecting from the left and right end parts of the second case 71, which pins are engaged freely slidably and rotatably with respective oblong apertures 72a and 72b formed in the carrying member 72. The oblong apertures 72a and 72b extend in the direction of the rotational axis of the turntable, namely, in the vertical direction, separated in a direction perpendicular to the direction of extension of the first guide member 14 and the second guide member 15, but offset from the direction of the rotational axis, that is, in the left-right direction. Further, the pins 71a and 71b that project from the second case 71, which is a component member of the optical pickup, extend in parallel with the disk-carrying surface of the turntable 7. With such a constitution, the position in height of the optical pickup with respect to the carrying member in the direction of the rotational axis of the turntable is made freely adjustable. In addition, the tilt angle of the turntable 7 with respect to the disk-carrying surface, in this case, an angle within a plane including the rotational axis of the turntable 7, is freely adjustable.

On the top end part of the carrying member 72 there is mounted freely rockably a first moving member 73. More specifically, pins 72c and 73a that fit into the carrying member 72 and the first moving member 73, respectively, and circular apertures 72d and 73b are provided with which the first moving member 73 is freely rockably mounted. The pins 72c and 73a extend perpendicular to the direction of the rrotational axis of the turntable 7, namely, in the left-right direction. Accordingly, the first moving member 73 is able to rock within a plane that includes the direction of the rotational axis. The first moving member 73 is supported freely rockably at its central portion, and pivotally supports the pins 71a and 71b of the second case 71 by a pair of U-shaped notches 73c formed in its front end part.

In the rear end part of the first moving member 73 there is formed a comb-like part 73d to which is interlocked an intermediate member 74. To the intermediate member 74 there is threadedly engaged a worm 75. The worm 75 is rotated by a motor 78 via a worm wheel 76 formed integrally with the worm and a worm 77 meshed with the worm wheel in succession. By rotation of the motor 78, the first moving member 73 is rocked, by which movement the height of the optical pickup including the second case 71 can be adjusted.

On the other hand, an intermediate member 80 is mounted freely movably in the front-rear direction (direction of the arrow Y and the direction opposite thereto). In more detail, oblong apertures 80a formed in the intermediate member 80 are engaged freely slidably with a pair of pins 72e projecting from the carrying member 72. In the front end part of the intermediate member 80 there is formed an oblong aperture 80b extending in the vertical direction (direction of the arrow Z and the direction opposite thereto), and the oblong aperture 80b is engaged freely slidably with a pin 71d projecting from the free end part of the second case 71, which is a component part of the optical pickup. In the rear end part of the intermediate member 80 there is provided a pin 80c which extends downward, and the pin 80c is engaged freely slidably with a groove 82a formed on the main surface of a cam member 82, which is formed as a discoidal second moving member provided freely rotatably on the bottom face of the carrying member 72. As is clear especially from FIGS. 15(a) and 15(b), the cam groove 82a is formed in an annular shape, and accordingly the cam surface is of an endless form. On the outer circumference of the cam member 82 there is formed a gear part 82b, and the cam member 82 is rotated by a motor 84 via a gear transmission mechanism 83 which includes the last stage gear 83a that meshes with the gear part. By the rotation of the intermediate member 80, the second case 71 is rocked with the pins 71a and 71b as the center and the tilt angle of the optical pickup is adjusted.

In the presently described embodiment, an intermediate member 80 is disposed between the cam member 82 in the second moving path and the second case 71. However, a construction in which the cam surface of the cam member 82 is slid directly against the pin 71d of the second case 71 may also be adopted. It should be noted, however, that in the latter case it is preferable to install the cam member 82 with its rotational axis perpendicular to the tilted surface of the optical pickup.

With the gear transmission mechanism 83 and the motor 84, a second driving source which rotates the cam member 82 as a second moving member is constructed. Further, with the second driving source, the cam member 82, the intermediate member 80, and the support mechanism composed of the oblong apertures 72a and 72b of the carrying member 72 and the pins 71a and 71b of the second case 71 that engage therewith for supporting the optical pickup in a freely tiltable manner within a plane containing the rotational axis of the turntable, there is formed a tilt servo mechanism which carries out optical axis adjustment so as to keep the recording surface of the disk placed on the turntable and the optical axis of the light beam projected from the optical pickup orthogonal with each other.

Moreover, a first driving source, which imparts a driving force to the first transfer member 73, is constituted by the motor 78, the worm 77, the worm wheel 76, the worm 75 and the intermediate member 74. In addition, with the first driving source, the first moving member 73, and a support mechanism composed of the oblong apertures 72a and 71b of the second case 71 that engages therewith, form a height adjusting mechanism which adjusts the height of the optical pickup in the direction of the rotational axis of the turntable 7.

Moreover, the second driving source, the cam member 82, the intermediate member 80, the first driving source and the first moving member 73 collectively form a pickup driving unit. The optical pickup is disposed on the carriage 17 at a position closer to the turntable than the pickup driving unit. Therefore, even when a disk placed on the turntable 7 is of a small diameter, it is easy to move the optical pickup in order to accommodate the particular inner circumference of the disk.

Figure 11:
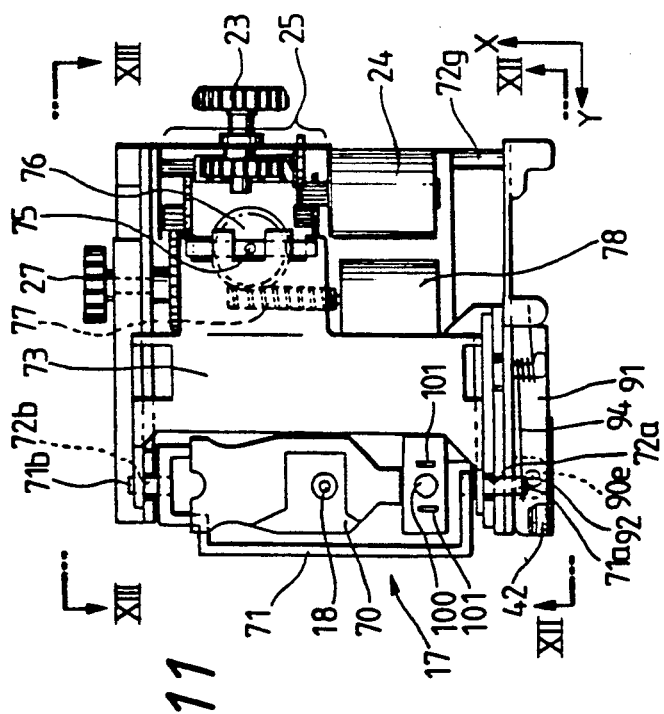
FIG. 11 is a plan view showing the constitution of the carriage of the player of FIG. 1.
Figure 12:
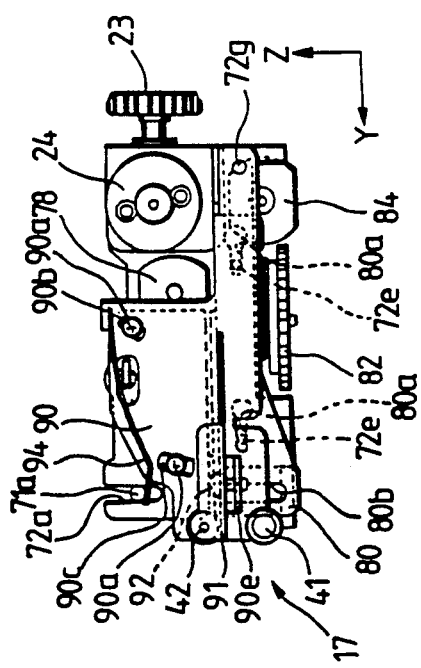
FIG. 12 is a front view of the carriage of FIG. 11.

As shown in FIGS. 4 and 11 through 14, the carriage 17 has a position adjustment member 90 which is provided at the right end part of the carrying member 72, which is a component part of the carriage. The position adjustment member 90 is supported freely rockably by a pin 72g projecting from the rear end of the carrying member 72. The pin 72g extends in the left-right direction, and hence the adjustment member 90 is free to rock within a plane that intersects the first and second guiding paths formed respectively by the first guide member 14 and the second guide member 15. Further, the position adjustment member 90 and the carrying member 72 are joined with two screws 90a as shown in FIG. 12. The screws 90a are threadedly engaged with the carrying member 72 inserted through oblong apertures 90b and 90c formed in the position adjustment member 90. By loosening the screws, it becomes possible to rock the position adjustment member 90.

Figure 14:
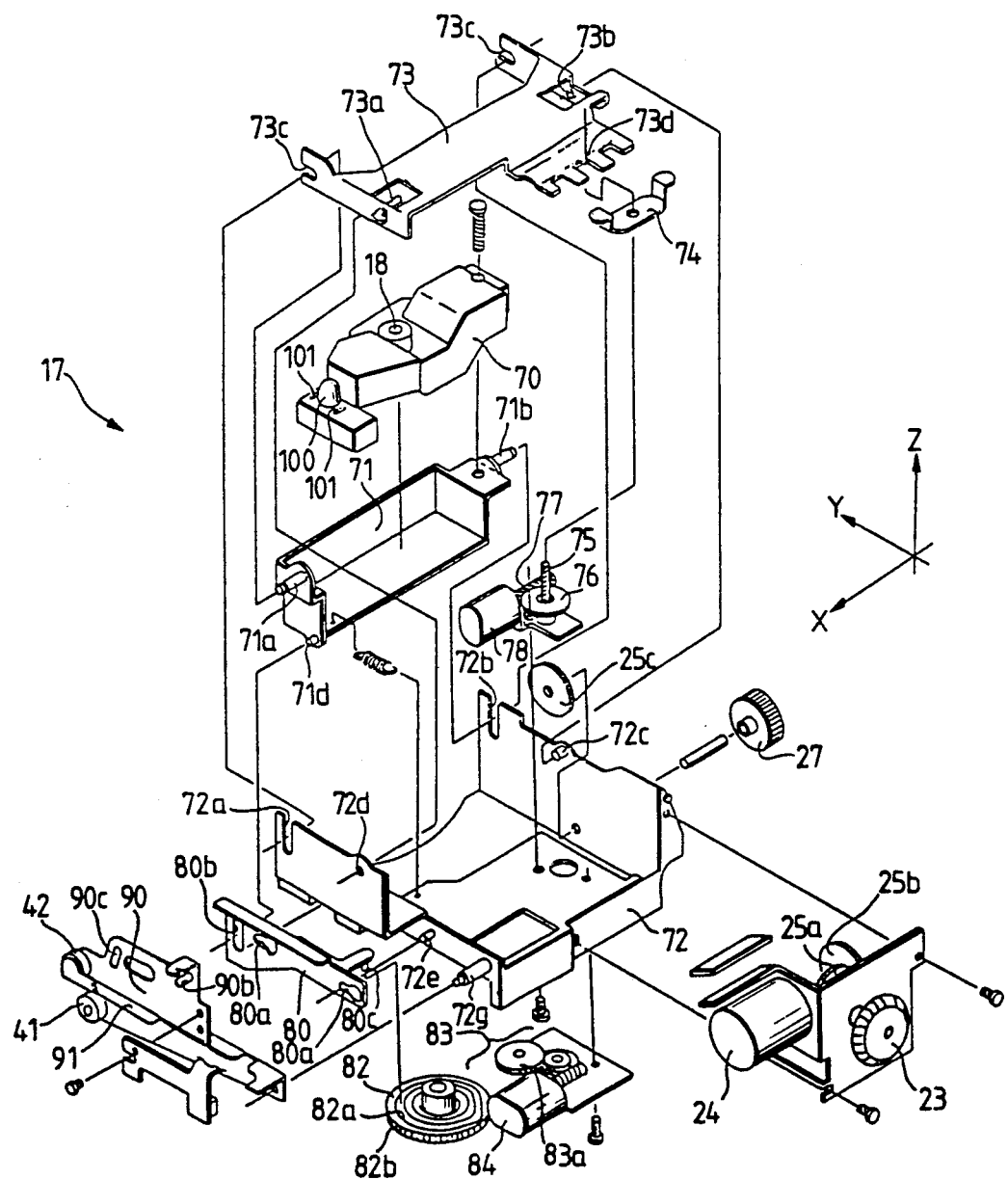
FIG. 14 is a disassembled perspective view of the carriage of FIG. 12.

Of the rollers 41 and 42 serving as engaging pieces, the lower roller 42 is provided at the free end part of the position adjustment member 90. Further, the other roller 42 is provided at the free end part of a sheet spring 91 installed flexibly on the position adjustment member and extending in its rocking direction. As shown in FIGS. 11 and 12, there is provided an adjustment screw 92 for adjusting the position of the free end part of the sheet spring 91 with respect to the position adjustment member 90. The adjustment screw 92 is abutted at its head against the top face of the sheet spring 91, and is threadedly engaged with a cut-out part formed in the position adjustment member 90. In addition, as shown in FIGS. 11 and 12, there is provided a spring member 92 which energizes the first moving member 73 in the downward direction, and which also energizes the second case 71 and the position adjustment member 90 in the upward direction. Moreover, as shown in FIG. 14, there is provided a coil spring 95 which energizes the second case 71 in the direction of approach to the carrying member 72 and the first moving member 73.

With this construction, the relative positional adjustment between the two sets of longitudinal guide members 15, 43 and 14, 44 which accommodate respective surfaces of the disk 10 and the carriage 17 can be accomplished with high accuracy.

With such a constitution, at the time of assembly of the disk player, one member 15 of the pair of longitudinal guide members 15 and 43 disposed corresponding, for example, to side A of the disk 10, is brought to engagement with the left end of the carrying member 72, which is a component part of the carriage 17. At the same time, the position of the position adjustment member 90, which is the other member that constitutes the carriage 17, is adjusted by loosening the screw 90a, and then the relative position between the energizing piece 41 on the position adjustment member and the other longitudinal guide member 43 is set for side A of the disk. Next, the carriage 17 is transferred to side B of the disk 10, and the carrying member 72 is engaged with one of the members (14) of the pair of longitudinal guide members 14 and 44 disposed corresponding to side B of the disk 10. At the same time, the position of the sheet spring 91 is adjusted by means of the adjusting screw 92 to set the relative position between the other engaging piece 42 provided on the free end part and the other longitudinal guide member 44 for side B of the disk.

In this manner, the relative position between the carriage 17 and the two sets of longitudinal guide members 15, 43 and 14, 44 (provided one set for each side of the disk 10) can both be set with high accuracy. This makes it possible to execute an angular positional adjustment in the tangential direction of the reading light beam from the optical pickup and the recording surface of the disk, for both sides of the disk 10, making it possible to accomplish the angular correction adjustment appropriate for both surfaces of the disk.

Moreover, the position adjustment member 90 is located at the right side end of the carrying member 72 so that the position adjustment in the tangential direction can easily be carried out.

As shown in FIGS. 11 and 14, at the end part of the first case housing the optical system there is provided a tilt angle sensor composed of light-emitting elements 100 and 101, which sense the relative tilt angle between the recording surface of the disk 10 placed on the turntable 7 and the optical axis of reading light beam projected on the recording surface.

Although not shown explicitly in the drawings, in the inventive double-side playing optical disk player there are provided various types of sensors besides the tilt angle sensor. As shown in FIG. 16, sensing signals issued from sensors 105 and 106 are sent to a control unit (CPU) 107 which actuates or stops various motors and the like, at timings that will be described later, in response to the various sensing signals thus produced.

Next, the operation of the double-side playing optical disk player with the above constitution will be described briefly with reference to FIG. 17.

By the rolling of the gear 27 over the rack member 30, the carriage is moved from the inner circumferential side to the outer circumferential side, and when the playing of the recording on the lower surface of the disk is completed, the carriage 17 is further moved toward the outside and is detached from the second guide member 15 and the linear guiding projection 43 of the lower chassis 5 to be fitted into the holding member 47. At the same time, the planetary gear 23 provided on the carriage 17 is meshed with the teeth of the sun gear 55. Because of this, the planetary gear 23 begins to roll on the sun gear 55. Then, the rotating member 50 carrying the holding member 47 is rotated, and the carriage 17 is inverted and positioned so as to play the upper recording surface of the disk 10, as indicated by the two-dot chain line in FIG. 4. At the same time, the gear 27 is engaged with the upper rack member 29 and the carriage 17 is detached from the holding member 47 and is moved to a position above the first guide member 14 and the guide rail 44. Thereafter, the disk is rotated in the direction opposite to that during playing of the lower recording side of the disk 10 to start the playing of the upper recording surface of the disk 10.

The inversion motion of the carriage 17 from the position corresponding to the upper recording surface of the disk 10 to the position corresponding to the lower recording surface is executed by following the steps opposite to those described above.

Figure 17:
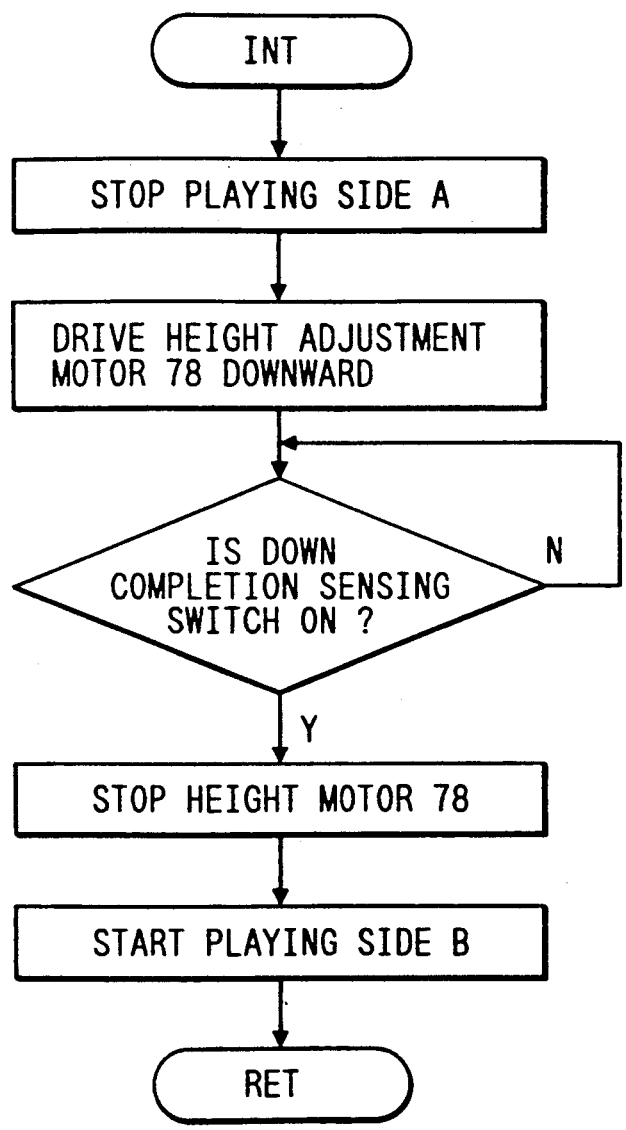
FIG. 17 is a flowchart for explaining the operation of the player of FIG. 1.

In addition, as shown in FIG. 17, in controlling the transfer mechanism to transfer the carriage 17 between the first and second guide mechanisms, the control unit (CPU) 107 actuates the height adjustment mechanism including the motor 78 that adjusts the height of the optical pickup to remove the optical pickup from the disk-carrying surface of the turntable.

On the other hand, at the time of playing side A, for example, of the disk is completed, if, in the condition where the optical pickup is moved by the height adjustment mechanism to its highest position, namely, the position of approach to the recording surface of the disk, the optical pickup is inverted in preparation for playing side B of the disk, then there is a possibility of bringing the optical pickup into contact with side B. However, this problem is eliminated with the invention by first separating the optical pickup from the disk, as described above.

Further, the control unit (CPU) 107 actuates the tilt servo mechanism including the motor 84 during playing of the disk to maintain the orthogonality condition between the disk surface and the optical axis of the projected light beam from the optical pickup.

Referring to the accompanying drawings, another embodiment of the double-side playing optical disk player in accordance with the present invention will now be described. In the following discussion, components that correspond to those of the double-side playing optical disk player described above are assigned identical reference numerals and a further detailed explanation thereof will be omitted.

In FIGS. 18 through 21, the carriage 17 has a pickup case 19 with a built-in optical pickup unit including the optical system composed of the objective lens 18 and the servo driving mechanism which servo drives the objective lens in two directions, namely, the direction of the optical axis (focusing direction) and a direction perpendicular to that direction (tracking direction). and a frame 20 which can be fitted freely slidably into the first and second guide members 14 and 15 that are fixed to the left-end part of the frame.

Figure 18:
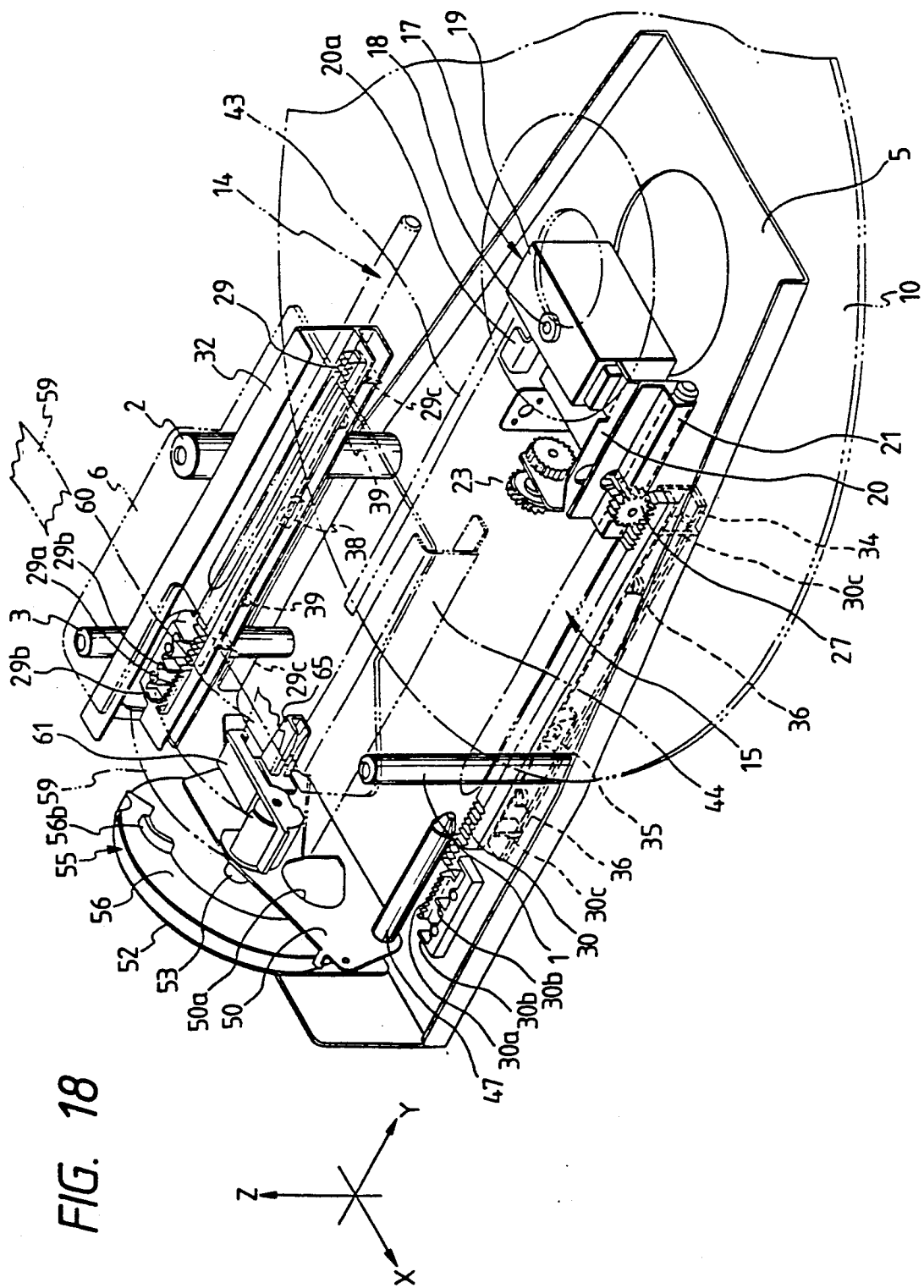
FIG. 18 is a perspective view showing the internal structure of a double-side playing optical disk player of another embodiment of the present invention.
Figure 19:
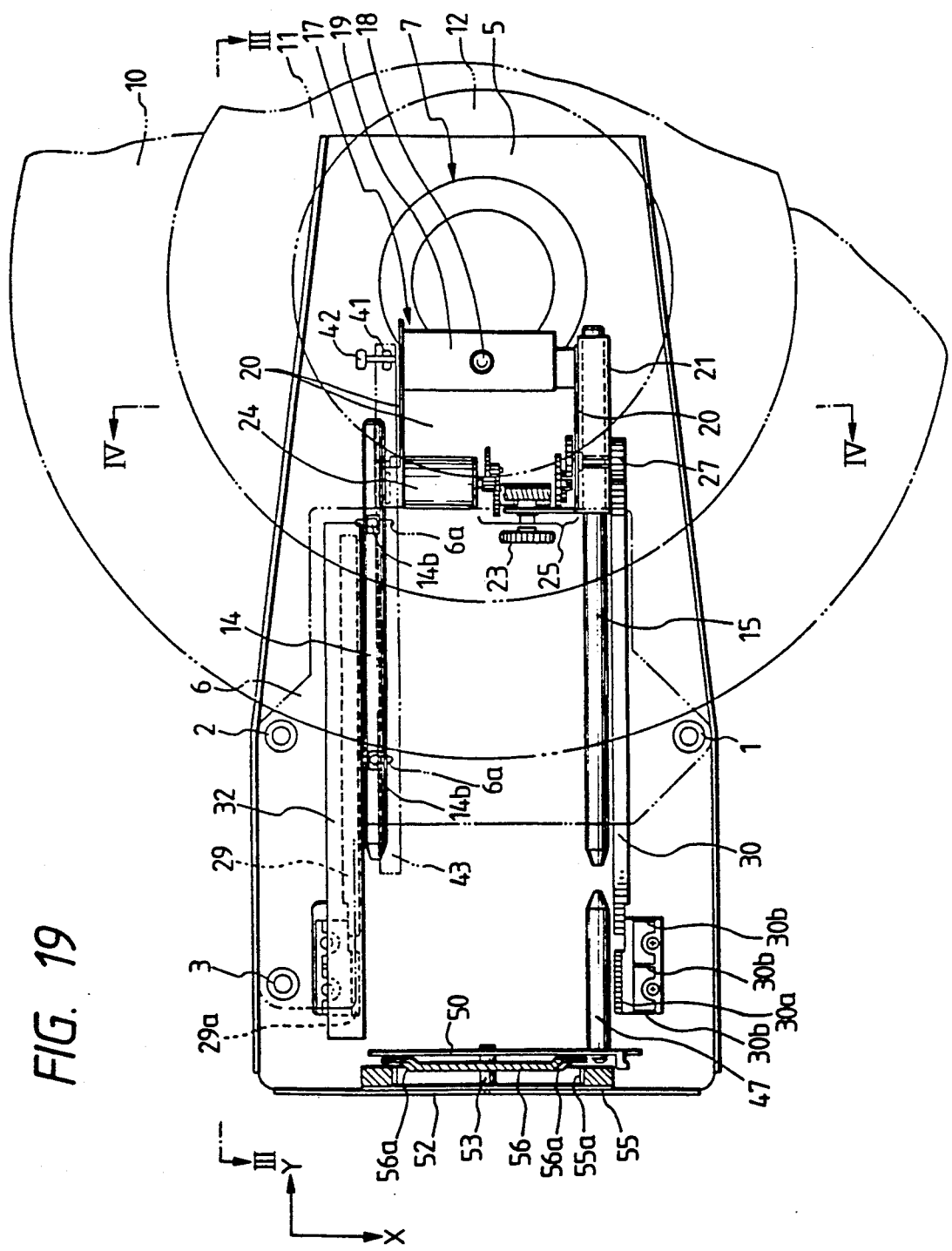
FIG. 19 is a plan view of the player of FIG. 18.
Figure 20:
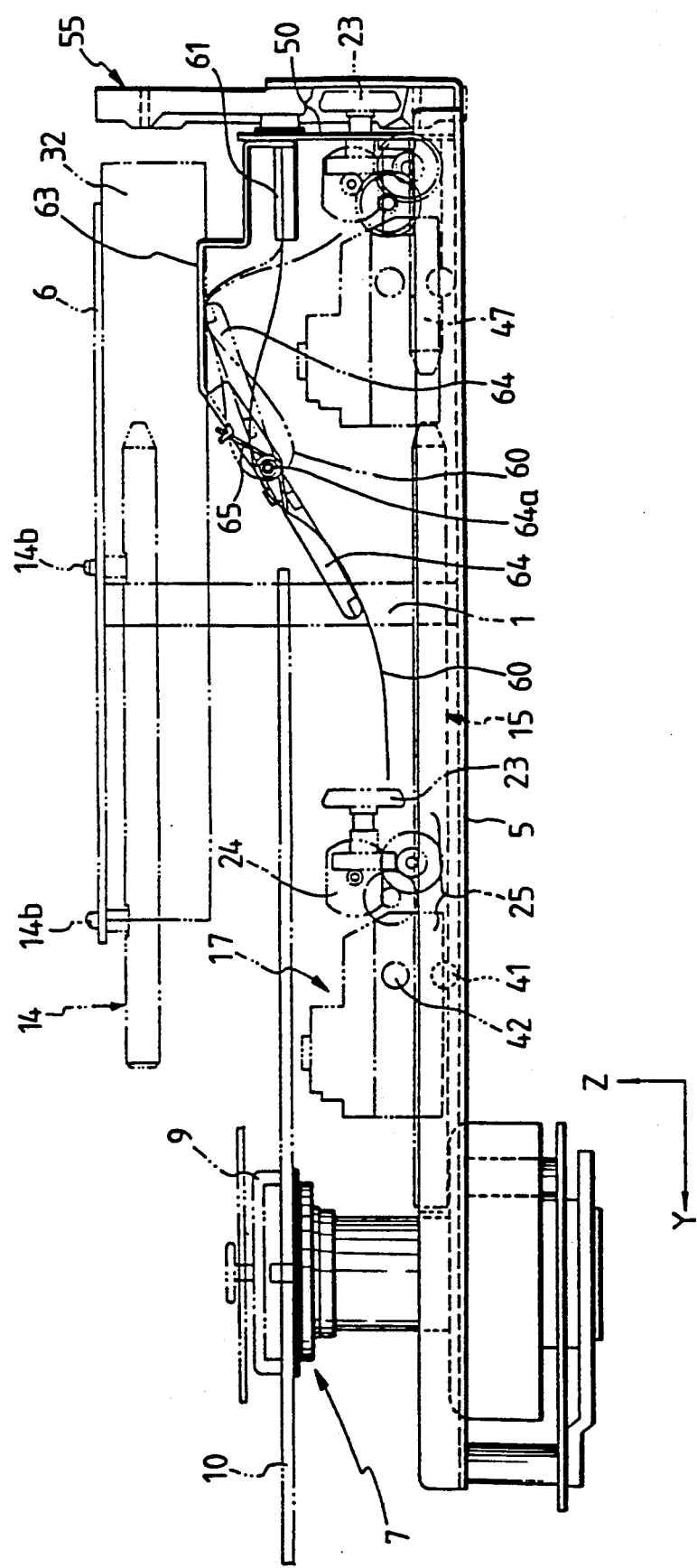
FIG. 20 is a right-side elevational view of the player of FIG. 18.

As is clear from FIGS. 18 and 19, both rack members 29 and 30 are separated at their rear end portions 29a and 30a with respect to their main body parts. The rear end portion 29a of the rack member 29 is attached to a bracket 32 fixed to the bottom face of the upper chassis 6, and the rear end portion 30a of the other rack member 30 is fixed to the lower chassis 5. The rear end portions 29a and 30a are attached with screws to the bracket 32 and the lower chassis 5 via flexible parts 29b and 30b, respectively. When forces greater than prescribed magnitudes are applied to the respective rear end portions, the flexible parts 29b and 30b are bent and the respective rear end portions are moved in the direction toward the front (direction of the arrow Y), namely, in the direction away from the transfer mechanism (described later). However, the movement toward the rear (direction opposite to that of the arrow Y) is regulated since stoppers (not shown) are abutted against the respective rear end portions.

As shown in FIGS. 18 and 19, the main body part except for the rear end portion 30a of the rack member 30 on the left side is attached via a pin 35 to approximately the central part of the bracket 34, which is fixed to the lower chassis 5 in such a manner as to be freely movably and freely rockably in the directions approaching to and departing from the gear 27. Further, there are formed pawl members 30c on the bottom face at both end parts of the main body part, which pawl members 30c are engaged with the bracket 34 so that the rocking of the main body part can be regulated within a predetermined range. Moreover, there are provided a pair of coil springs in the front and the rear for energizing the main body part to bring it closer to the gear 27.

Figure 21:
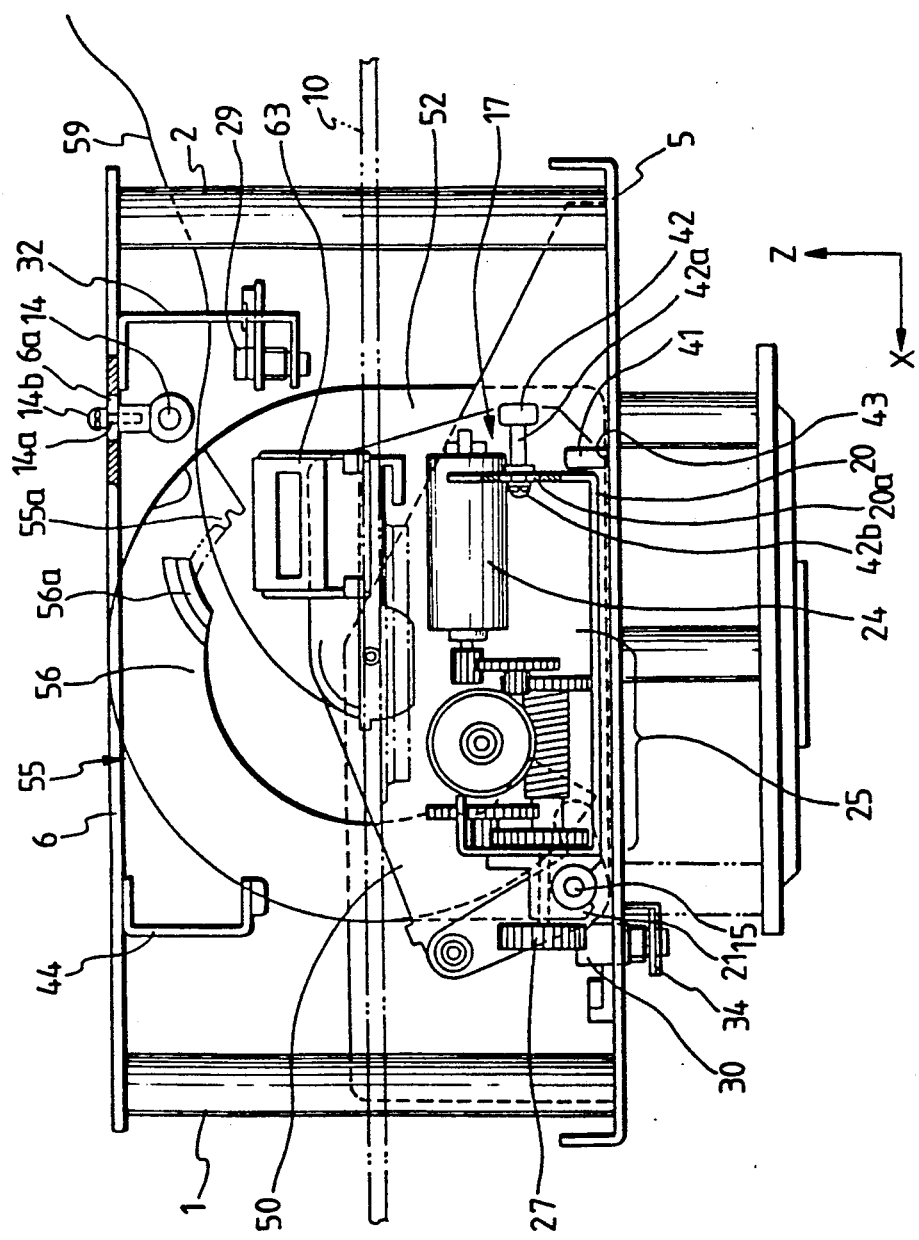
FIG. 21 is a front view of the same.

As shown in FIGS. 18 and 21, the main body part, except the rear end portion 29a of the rack member 29 on the right side, is attached freely rockably with a pin 38 to a bracket 32, similar to the rack member 30 on the left side. Further, the rack member 29 has a pawl member 29c which regulates the rocking range by engagement with the bracket 32, and is energized by a coil spring 39 in the direction of approach to the gear 27.

As shown in FIG. 21, the support shaft 24a of the upper roller 42, which is one of the rollers 41 and 42 forming a pair of energizing elements provided above and below, is inserted through an oblong aperture 20a formed in the frame 20 of the carriage 17. It is possible to adjust the position of the roller 42 within a phase intersecting the first and second moving paths by loosening the screw 42b, which is threadedly engaged with the support shaft. Accordingly, setting the relative positions for the two sets of longitudinal guide members, provided one set for each of the two surfaces of the disk, and a pair of engaging parts of the carriage 17 can be accomplished with high accuracy. Namely, at the time of assembly of the disk player, the relative position is set between one member (15) of the pair of longitudinal guide members 15 and 42 corresponding to side A (lower side, for example) of the disk, and one engaging part 21 of the carriage 17. At the same time, the relative position is set between the other longitudinal guide member 43 on side A and the first engaging piece 41 of the other engaging part of the carriage 17. Next, the carriage 17 is transferred by inverting it to side B of the disk by the transfer mechanism, the relative position is set between one member (14) of the pair of longitudinal guide members 14 and 44 corresponding to side B of the disk and one of the engaging parts 21 of the carriage 17, and at the same time the relative position is set between the other longitudinal guide member 44 for side B and the second engaging element 42 of the other engaging part of the carriage 17. In this case, since the position of the second engaging element 42 is adjustable, the relative position between the engaging part of the two sets of longitudinal guide members, provided one set corresponding to each of the two sides of the disk, and the carriage 17 can be set with high accuracy.

As shown in FIGS. 19 and 21, the support shaft 14a for attaching the first guide member 14 to the upper chassis 6 is inserted through an oblong aperture 6a extending in the left-right direction (direction of the arrow X and the direction opposite to it). It is possible to shift the position of the first guide member 14 in the left-right direction by loosening the screw 14b threadedly engaged with the support shaft 14a. Namely, it is possible to adjust the position within a plane perpendicular to the rotational shaft of the turntable (shown in FIG. 20) of the guiding path of the first guide mechanism including the first guide member 14.

With this arrangement, it is possible to make the rotational axis of the disk and the extension of the moving locus of the optical axis of the projected light beam accompanying the motion of the optical pickup along the disk recording surface to intersect each other for both surfaces of the disk. Namely, at the time of assembly of the disk player, the relative position between the second guide mechanism, which guides the carriage 17 and the turntable 7 along side B (lower surface, for example) of the disk, and the rotational shaft of the turntable 7 is adjusted to cause the extension of the moving locus of the optical axis of the light beam projected onto side B of the disk to intersect the rotational axis of the disk. Then, the extension of the moving locus of the optical axis of light beam projected onto side A of the disk is set to intersect the rotational shaft of the turntable by adjusting the position of the guide path of the first guide path of the first guide mechanism, as above. In this manner, substantial orthogonality between the rotational axis of the disk and the extension of the moving locus of the optical axis of the projected light beam can be obtained for both surfaces of the disk. As a result, stable reproduced signals can always be obtained for both surfaces of the disk.

Next, the reason will be explained for making it possible to move the rear end portions of a pair of rack members 29a and 30a of a pair of rack members 29 and 30 from their stationary positions in the direction of separation from the transfer mechanism (direction of the arrow Y) in response to a force greater than a prescribed magnitude.

As explained above, a system is realized in which, by rotation of the gear 27, the carriage 17 rolls on its own on each of the pair of rack members 29 and 30, during which time the carriage 17 is inverted between each of the rack members. With this construction, there is exerted against the gear 27 that rolls on the rack member, a reaction force accompanying the rolling motion from the rack member side. Further, another reaction force accompanying the inversion of the carriage 17 due to the transfer mechanism including the sun gear 55 is applied via the planetary gear 23 to the carriage 17 from the sun gear side. The planetary gear 23 meshes with the sun gear 55 at the time the gear 27 is about to complete its rolling motion on the rack member. Thus, the reaction forces oppose one another at this time, and there may occur a case in which the carriage 17 cannot move between the rack member and the sun gear 55. However, by making at least a part of the rack member movable in the forward direction when there is applied a force greater than a predetermined magnitude, the competing condition between the reaction forces can be avoided, and the carriage 17 can smoothly pass between each of the rack members and the transfer mechanism.

Moreover, in the present embodiment, at least one of the rack members 29 and 30 is made movable in the forward direction (direction of the arrow Y). However, an effect similar to the above can be obtained by using a construction in which at least a part of the pair of rack members is compressed in its direction of expansion and compression by being distorted by a force greater than a predetermined magnitude.

The operation of the double-side playing optical disk player with the above construction will now be described briefly.

Figure 22:
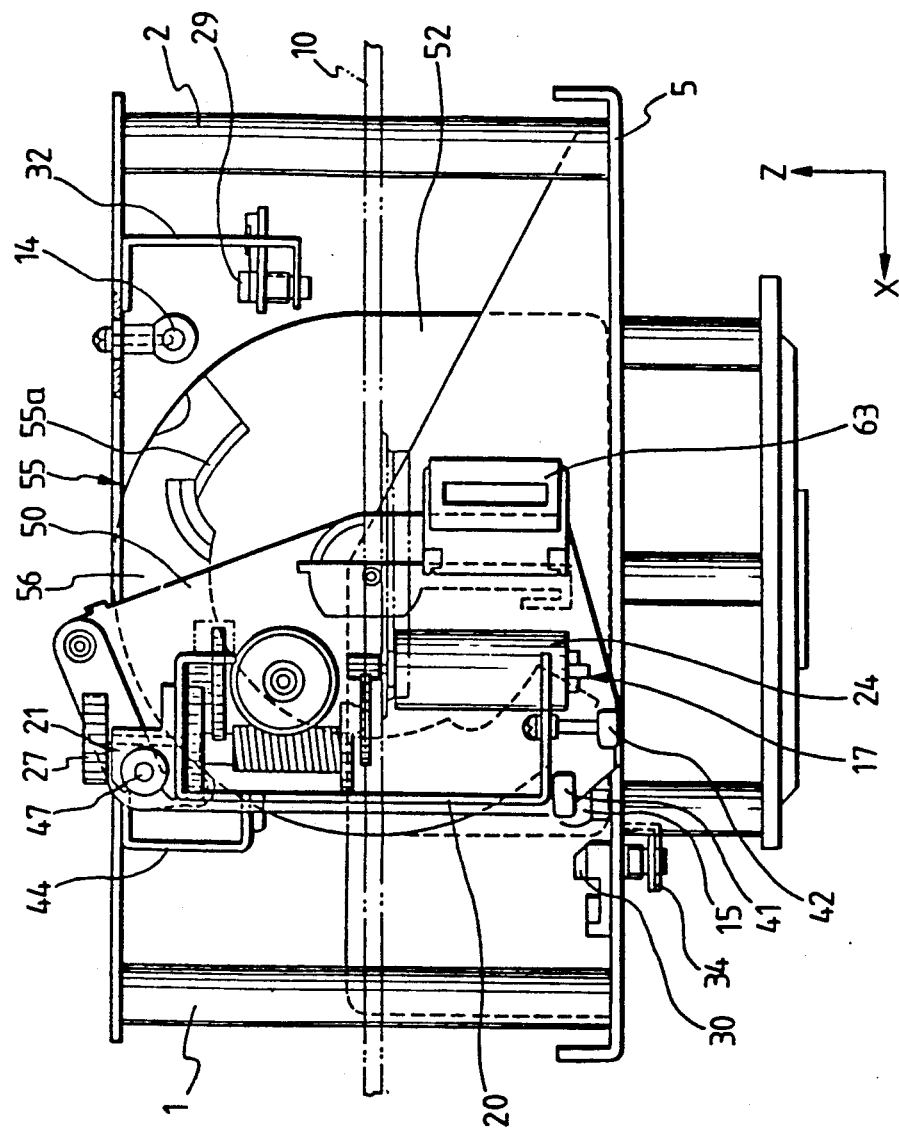
FIG. 22 is a front view illustrating the operation of the double-side playing optical disk player shown in FIG. 18.
Figure 23:
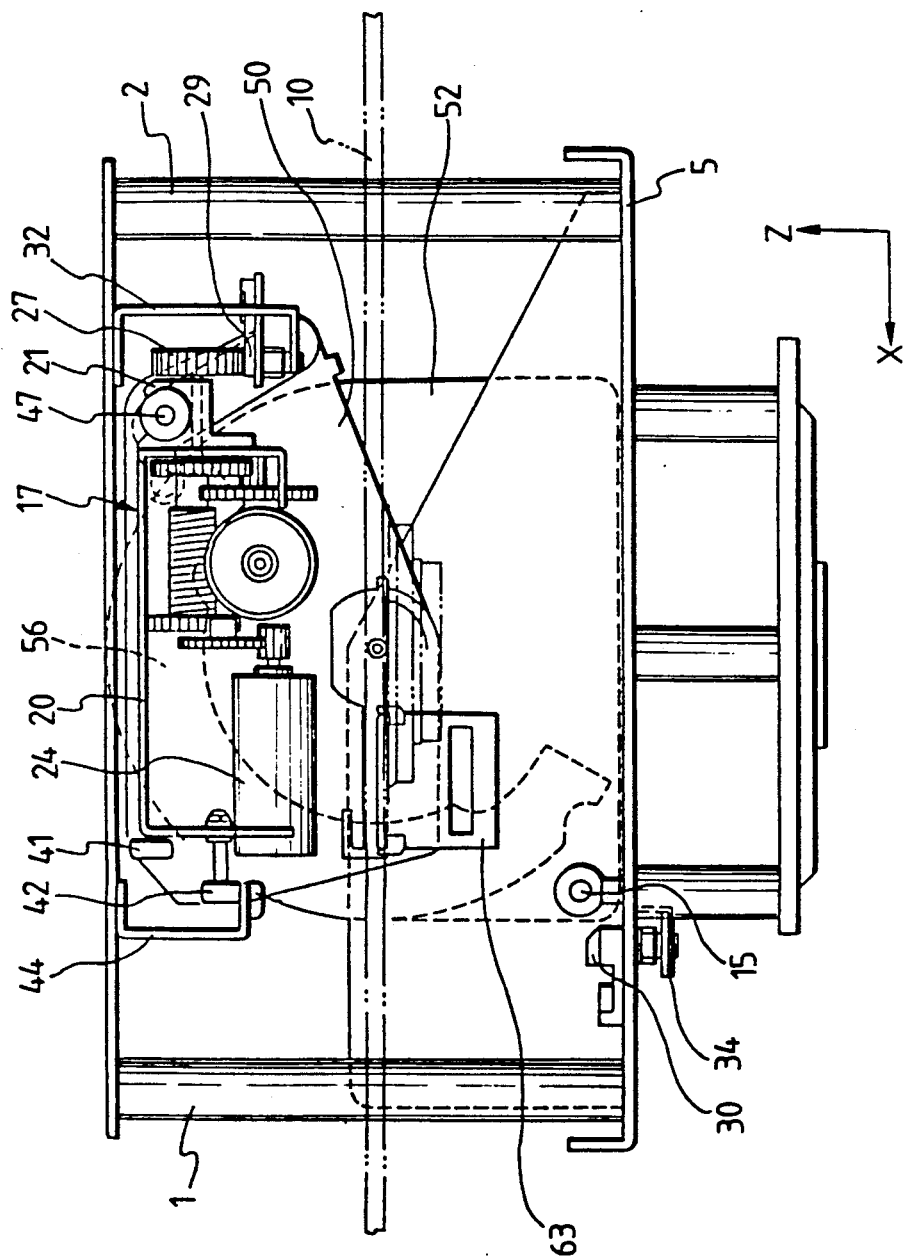
FIG. 23 is a front view of the player of FIG. 18.

By rolling of the gear 27 on the rack member 30 the carriage 17 moves from the inner circumferential side to the outer circumferential side of the disk 10 to complete the playing of the lower recording surface of the disk 10. Then the carriage 17 is moved further to an outward position and is detached from the second guide member 15 and the linear guide surface 43 of the lower chassis 5 to be fitted into the holding member 27. Further, an overhand part 20a (shown in FIG. 18) formed on the frame 20 of the carriage 17 fits into a gripping member 65 (shown in FIG. 18) fixed to the rotating member 50. At the same time, the planetary gear 23 provided on the carriage 16 is meshed with the teeth of the sun gear 55. In this way, the planetary gear 23 starts to roll on the sun gear 55. Then, the rotating member 50 carrying the holding member 47 is rotated and the carriage 17 is inverted and positioned to play the upper recording surface of the disk 10 as shown in FIG. 22. At the same time, the gear 27 meshes with the upper rack member 29 and the carriage 17 is detached from the holding member 47, and is then moved to the first guide member 14 and the guide rail 44. Thereafter, the disk is rotated in the direction opposite to that during the playing of the lower recording surface of the disk to begin the playing of the upper recording surface of the disk 10.

The inverting motion of the carriage 17 from the position corresponding to the upper recording surface of the disk 10 to the position corresponding to the lower recording surface can be carried out by following steps in the direction opposite to that explained above.

Figure 24:
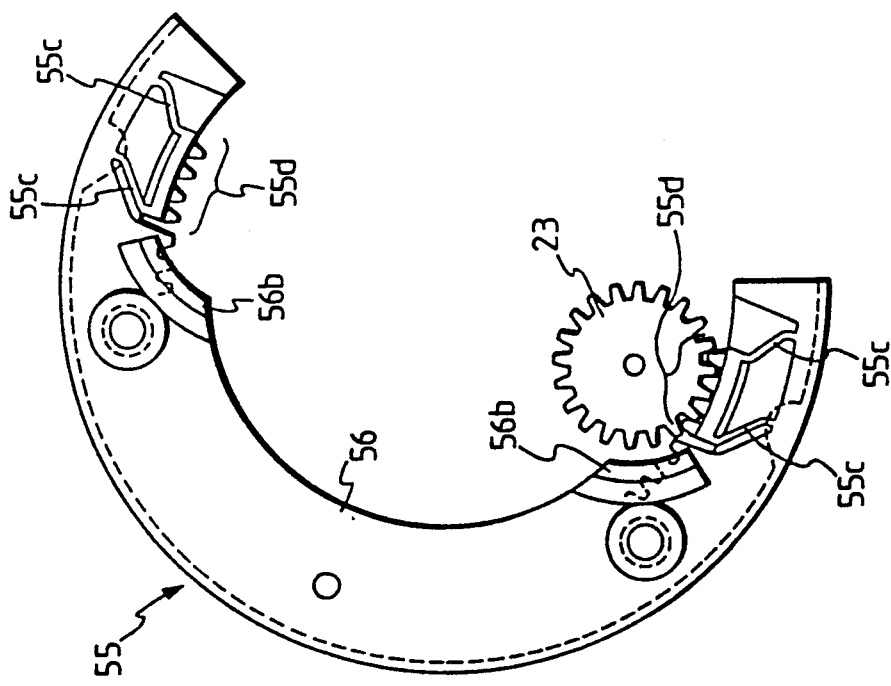
FIG. 24 is a diagram showing the constitution of a solar gear used in the player of FIG. 18.

Further, in the present embodiment, when a force greater than a prescribed magnitude is applied to the rear end portions 29a and 30a of the pair of rack members 29 and 30, the two reaction forces then present act on the carriage 17 in opposing directions. On the other hand, as shown in FIG. 24, by providing flexible parts 55c at both end parts of the sun gear 55 to make the teeth 55d carried by the flexible parts movable with respect to the remaining teeth, competition between the two reaction forces acting on the carriage 17 from the rack member side and the sun gear 55 side is eliminated in this embodiment.

Figure 25:
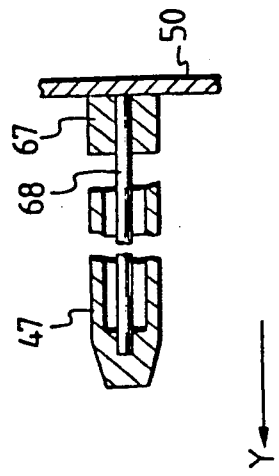
FIG. 25 is a diagram showing another example of the holding member.
Figure 26:
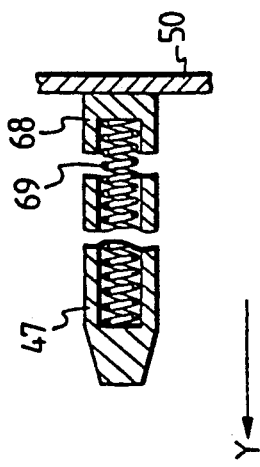
FIG. 26 is a diagram showing still another example of the holding member.

Modifications of the holding member which holds the carriage 17 are shown in FIGS. 25 and 26. The holding member 47 shown in FIG. 25 is loosely inserted on a flexible rod 68 extending from a base member 67 attached to the rotating member 50, and is fixed to the free end part of the flexible rod. Further, the holding member 47 shown in FIG. 26 is loosely inserted over a coil spring 69 which is attached at one end part to the base member 68 fixed to the rotating member 50 and is attached at the other end part to the holding member 47.

In the arrangements shown in FIGS. 25 and 26, even when the holding member 47 is attached to the rotating member 50 with some deviation from the normal position, when the carriage 16 is about to transit from the first and second guide members 14 and 15 to the holding member 47, the flexible rod 68 or the coil spring 69 is flexed appropriately within a plane perpendicular to the direction of extension, and thus the carriage can be held in such a manner as to be guided smoothly.

In accordance with the present invention, stable reproduced signals can be obtained for both surfaces of the disk, and it is possible to quickly execute the adjusting work needed for obtaining the required orthogonality condition between the rotational axis of the disk and the extension of the moving locus of the optical axis of a projected light beam that accompanies the motion of the optical pickup along the recording surfaces of the disk.

Further, since especially the tilt servo mechanism can be made small in size, miniaturization of the player as a whole can be achieved, and smooth playing of the disk can be obtained, even for a greatly warped disk.

Moreover, it is possible to carry out an angle correction adjustment for both surfaces of the disk. Thus, the invention provides a player both of reduced size and reduced cost.

What is claimed is:

1. In a double-side playing optical disk player which plays both sides of a disk by driving and guiding with guide driving means a carriage that carries an optical pickup along both recording surfaces of a disk placed on a turntable, the improvement wherein said guide driving means comprises: first and second guide mechanisms disposed on both sides of a disk-carrying surface of said turntable for carrying said carriage freely slidably and in such a way as to permit engaging/disengaging of said carriage at respective prescribed engaging-/disengaging positions of said first and second guide mechanisms, and a transfer mechanism for transferring said carriage from the engaging/disengaging position of one of said first and second guide mechanisms to the engaging/disengaging position of the other guide mechanism, one of said first and second guide mechanisms comprising a pair of fixed guide members abutting freely slidably on both ends of said carriage, and the other guide mechanism comprising a movable guide member for guiding said carriage provided freely movable pivotally within a plane substantially perpendicular to a rotational axis of said turntable, and means for fixing said movable guide member.

2. The double-side playing optical disk player as claimed in claim 1, wherein the position of said rotational axis of said turntable is variable.

3. The double-side playing optical disk player as claimed in claim 1 or 2, wherein a point of pivotal support of said movable guide member is arranged at a position corresponding at least approximately to an inner circumference of said disk placed on said turntable.

4. In a double-side playing optical disk player which plays both sides of a disk by driving and guiding with guide driving means a carriage that carries an optical pickup along both recording surfaces of a disk placed on a turntable, the improvement wherein said guide driving means comprises: first and second guide mechanisms disposed on both sides of a diskcarrying surface of said turntable for carrying said carriage freely slidably and in such a way as to permit engaging/disengaging of said carriage at prescribed engaging/disengaging positions of said first and second guide mechanisms, and a transfer mechanism for transferring said carriage from the engaging/disengaging position of one of said first and second guide mechanisms to the engaging/disengaging position of the other guide mechanism, one of said first and second guide mechanisms comprising a pair of fixed guide members abutting freely slidably on both ends of said carriage, and the other guide mechanism comprising a fixed support member, a movable guide member for guiding said carriage provided on said fixed support member freely movable pivotally within a plane substantially perpendicular to a rotational axis of said turntable, and frictional force imparting means for imparting a frictional force between a free end part of said movable guide member and said fixed support member.

5. The double-side playing optical disk player as claimed in claim 4, wherein said frictional force imparting means comprises pressing means for pressing said free end part of said movable guide member toward said fixed support member.

6. The double-side playing optical disk player as claimed in claim 4 or 5, wherein said player further comprises a longitudinal adjustment member provided freely rockably on said fixed support member and engageable at its free end part with said free end part of said movable guide member.

7. The double-side playing optical disk player as claimed in claim 4 or 5, wherein a direction of extension of said adjustment member is substantially parallel with a center axis of said movable guide member.

8. The double-side playing optical disk player as claimed in claim 6, wherein a direction of extension of said adjustment member is substantially parallel with a center axis of said movable guide member.

9. In a double-side playing optical disk player which plays both sides of a disk by driving and guiding with guide driving means a carriage that carries an optical pickup along both recording surfaces of a disk placed on a turntable, the improvement wherein said guide driving means comprises: first and second guide mechanisms disposed on both sides of a diskcarrying surface of said turntable for carrying said carriage freely slidably and in such a way as to permit engaging/disengaging of said carriage at prescribed engaging/disengaging positions of said first and second guide mechanisms, and a transfer mechanism for transferring said carriage from the engaging/disengaging position of one of said first and second guide mechanisms to the engaging/disengaging position of the other guide mechanism, and driving means for moving said carriage on said first and second guide mechanisms and for transferring said carriage by driving said transfer mechanism, said player further comprising a support mechanism for supporting said optical pickup on said carriage in such a way as to be able to freely adjust a height position of said optical pickup in a direction of a rotational axis of said turntable and to be able to adjust freely a tilt angle of said optical pickup with respect to said disk-carrying surface, and pickup driving means for adjusting said height position and said tilt angle by moving said optical pickup.

10. The double-side playing optical disk player as claimed in claim 9, wherein said transfer mechanism transfers said carriage along a plane intersecting guiding directions of said guide mechanisms.

11. The double-side playing optical disk player as claimed in claim 9 or 10, wherein said optical pickup is disposed on said carriage at a position closer to said turntable than said pickup driving means.

12. The double-side playing optical disk player as claimed in claim 9 or 10, wherein a pair of oblong apertures are formed in said carriage each extending in said direction of said rotational axis of said turntable and are respectively substantially perpendicular to said guiding directions of said guide mechanisms and are separated in a direction different from said direction of said rotational axis of said turntable, and wherein said support mechanism comprises pins projecting from said optical pickup and fitted into said oblong apertures, and wherein said pickup driving means comprises a first moving member for pivotally supporting said pins, said first moving member being provided freely movably within a plane containing said direction of said rotational axis, a second moving member provided freely movably within said plane and engaged with a free end part of said optical pickup, and a driving source for imparting a driving force to said first and second moving members.

13. The double-side playing optical disk player as claimed in claim 11, wherein a pair of oblong apertures are formed in said carriage each extending in said direction of said rotational axis of said turntable and mutually substantially perpendicular with respect to said guiding directions of said guide mechanisms and are separated in a direction other than that of said rotation axis, and wherein said support mechanism comprises pins projecting from said optical pickup and fitted into said oblong apertures, and wherein said pickup driving means comprises a first moving member provided freely movably within a plane containing said direction of said rotational axis and supporting said pins, a second moving member provided freely movably within said plane and engaging with a free end part of said optical pickup, and a driving source for imparting a driving force to said first and second moving members.

14. A tilt servo mechanism for adjusting an optical axis of an optical pickup carried by a carrying member guided in a radial direction of a turntable of an optical disk player. said tilt servo mechanism comprising support means for supporting in a freely tiltable manner said optical pickup within a plane containing a rotational axis of said turntable; a cam member provided on said carrying member freely rotatably and having a rotational axis substantially perpendicular to a tilted plane of said optical pickup, said cam member having an endless cam surface end that engages freely slidably with a free end part of said optical pickup; and a driving source for rotating said cam member.

15. A tilt servo mechanism for adjusting an optical axis of an optical pickup carried by a carrying member guided in a radial direction of a turntable of an optical disk player, said tilt servo mechanism comprising, support means for supporting said optical pickup in a freely tiltable manner within a plane containing a rotational axis of said turntable of said optical pickup, an intermediate member provided freely reciprocatably on said carrying member and being engaged at an end part of an outward stroke thereof with a free end part of said optical pickup, a cam member provided freely rotatably on said carrying member having an endless cam surface that engages freely slidably with said end part of said intermediate member on a return stroke thereof, and a driving source for rotating said cam member.

16. In a double-side playing optical disk player which plays both sides of a disk by driving and guiding with guide driving means a carriage that carries an optical pickup along both recording surfaces of a disk placed on a turntable with guide driving means, the improvement wherein said guide driving means comprises:

first and second guide mechanisms disposed on both front and rear surfaces of a disk-carrying surface of said turntable for permitting engaging/disengaging of said carriage at prescribed engaging/disengaging positions of said first and second guide mechanisms;

a transfer means for transferring from the engaging-/disengaging position of one of said first and second guide mechanisms to the engaging/disengaging position of the other guide mechanism; and driving means for moving said carriage on said first and second guide mechanisms and transferring said carriage by driving said transfer means; and wherein said player further comprises a support mechanism for supporting said optical pickup on said carriage with a height position of said optical pickup in a direction of a rotational axis of said turntable being freely adjustable, pickup driving means for adjusting said height position by moving said optical pickup, and control means for controlling said transfer means and said driving means, said control means controlling said pickup driving means to remove said optical pickup from said disk-carrying surface when controlling said transfer means in transferring said carriage between said first and second guide mechanisms.

17. A double-side playing optical disk player which plays both sides of a disk by driving and guiding a carriage that carries an optical pickup on first and second paths on respective recording surfaces of said disk placed on a turntable, said doubleside playing optical disk player comprising a set of mutually parallel longitudinal guide members defining said first and second paths, and a transfer means for transferring said carriage from one set of longitudinal guide members to the other set, said carriage comprising a pair of engaging means for engaging the respective members of each set, at least one of said engaging means comprising two engaging elements, a position within a plane intersecting said first or second moving paths of at least one of said two engaging elements being adjustable.

18. In a double-side playing optical disk player which plays both sides of a disk by driving and guiding with guide driving means a carriage that carries an optical pickup along both recording surfaces of a disk placed on a turntable, the improvement wherein said guide driving means comprises first and second guide mechanisms disposed on both sides of a diskcarrying surface of said turntable to permit engaging/disengaging of said carriage at prescribed positions of said first and second guide mechanisms, and a transfer means for transferring said carriage from the engaging/disengaging position of one of said first and second guide mechanisms to the engaging/disengaging position of the other guide mechanism, whereby the position of a guiding path of at least one of said first and second guide mechanisms is made freely adjustable within a plane perpendicular to a rotational axis of said turntable.

19. The double-side playing optical disk player as claimed in claim 18, wherein said first and second guide mechanisms comprise a pair of guide members, said carriage fitting freely slidably on one of said guide members, and abutting against the other of said guide members.

20. In a double-side playing optical disk player which plays both sides of a disk by driving and guiding with guide driving means a carriage that carries an optical pickup along both recording surfaces of a disk placed on said turntable, the improvement wherein said guide driving means comprises, first and second guide mechanisms disposed on both sides of a diskcarrying surface of said turntable and carrying said carriage in such a way as to permit engaging/disengaging of said carriage at prescribed positions of said first and second guide members, a gripping member for gripping said carriage located at said prescribed positions, a transfer mechanism for transferring said gripping member from the engaging/disengaging position of one of said first and second guide mechanisms to the engaging/disengaging position of the other guide mechanism along a plane intersecting guiding directions of said guide mechanisms, and driving means for moving said carriage on said first and second guide mechanisms and transferring said gripping member by driving said transfer mechanism, said driving means comprising a pair of rack members provided parallel to a direction of guiding thereof, a gear carried freely rotatably by said carriage and meshing with each of said rack members, and a driving source provided on said carriage for imparting a torque to said gear, a rotational axis of said gear being within a plane intersecting longitudinal directions of said rack members, and teeth of said pair of rack members being formed so as to be in a transfer range of said gripping member.

21. A double-side playing optical disk player which plays both sides of a disk by driving and guiding a carriage carrying an optical pickup along both recording surfaces of a disk placed on a turntable with guide driving means and applying electrical power and transmitting electrical signals with wiring means the improvement wherein said guide driving means comprises: first and second guide mechanisms disposed on both sides of a disk-carrying surface of said turntable for carrying the carriage in such a manner as to permit engagement-/disengagement thereof at prescribed engaging/disengaging positions of said first and second guiding means, a gripping member for gripping said carriage when located at said prescribed engaging/disengaging positions, a transfer mechanism for transferring said gripping member from the engaging/disengaging position of one of said first and second guide mechanisms to the engaging/disengaging position of the other guide mechanism along a plane intersecting a direction of guiding of said guide mechanisms, and driving means for moving said carriage on said first and second guide mechanisms and transferring said gripping member by driving said transfer mechanism, said transfer mechanism comprising a rotating member provided freely rotatably within said plane for carrying said gripping member, and wherein said wiring means comprises a first flexible part disposed in a plane perpendicular to a rotational axis of said rotating member and a second flexible part disposed in a plane parallel to said rotation shaft, and a flexible substrate engaged with said rotating member.

22. The double-side playing optical disk player as claimed in claim 21, wherein said disk player comprises winding/feeding means provided on said rotating member for winding and feeding of said second flexible part in response to motion of said carriage.

23. The double-side playing optical disk player as claimed in claim 22, wherein said winding/feeding means comprises a first arm member for holding freely slidably said second flexible part attached on a tip part thereof and attached to said rotating member, said first arm member having the form of a cantilever, a second arm member for holding freely slidably a second flexible member at a free end part thereof, said second arm member being installed freely rockably on said tip part of said first arm member at a position between a winding position and a feeding position thereof, and energizing means for energizing said second arm member toward said winding position.

* * * * *